(12) United States Patent
McGee et al.

(10) Patent No.: US 7,219,034 B2
(45) Date of Patent: May 15, 2007

(54) SYSTEM AND METHODS FOR DISPLAY OF TIME-SERIES DATA DISTRIBUTION

(75) Inventors: John J. McGee, Manchester, NH (US); Michael B. Courtemanche, Hollis, NH (US); Ralph L. Beck, Sterling, MA (US)

(73) Assignee: Opnet Technologies, Inc., Bethesda, MD (US)

( * ) Notice: Subject to any disclaimer, the term of this patent is extended or adjusted under 35 U.S.C. 154(b) by 734 days.

(21) Appl. No.: 10/243,534

(22) Filed: Sep. 13, 2002

(65) Prior Publication Data

US 2003/0088542 A1 May 8, 2003

Related U.S. Application Data

(60) Provisional application No. 60/322,021, filed on Sep. 13, 2001.

(51) Int. Cl.
*G06F 17/18* (2006.01)

(52) U.S. Cl. ............. 702/180; 702/179; 702/190; 702/182; 707/101; 707/6; 707/7; 348/672; 358/500; 358/522; 382/168; 382/171; 382/241

(58) Field of Classification Search ......... 702/179, 702/180, 182; 382/168, 171, 241; 348/672; 358/500, 522; 707/101, 6, 7
See application file for complete search history.

(56) References Cited

U.S. PATENT DOCUMENTS 4,821,220 A   4/1989   Duisberg
5,062,055 A   10/1991  Chinnaswamy et al. .... 364/513
5,101,348 A   3/1992   Arrowood et al. .......... 395/200
5,161,116 A   11/1992  Schneider et al. ...... 364/551.01
5,307,499 A   4/1994   Yin
5,343,538 A * 8/1994   Kasdan ...................... 382/165
5,367,473 A   11/1994  Chu et al. ............. 364/551.01
5,375,070 A   12/1994  Hershey et al. ............ 364/550
5,432,932 A   7/1995   Chen et al. ................. 395/650
5,450,406 A   9/1995   Esaki et al. ............... 370/60.1

(Continued)

FOREIGN PATENT DOCUMENTS

DE    296 00 609 U 1       3/1997

(Continued)

OTHER PUBLICATIONS

Chen et al., 'Quantile and Histogram Estimation', 2001, Winter Simulation Conference, pp. 451-459.*

(Continued)

*Primary Examiner*—Marc S. Hoff
*Assistant Examiner*—Elias Desta
(74) *Attorney, Agent, or Firm*—Davis & Bujold, P.L.L.C.

(57) ABSTRACT

A system and methods for displaying data distribution information for time-series data is described. The methods include computing a condensed quantile function that may be used to generate approximate histograms for the time-series data, while decreasing the data storage requirements for generating a series of histograms for time-series data. The methods further include displaying the data distribution information using stack-bar histograms, many of which may be shown in a single display to permit a user to discern trends in the data distribution information. Methods for merging condensed quantile function tables are also described.

17 Claims, 15 Drawing Sheets

U.S. PATENT DOCUMENTS

| | | | |
|---|---|---|---|
| 5,459,837 A | 10/1995 | Caccavale | 395/184.01 |
| 5,459,868 A | 10/1995 | Fong | |
| 5,475,625 A | 12/1995 | Glaschick | 395/600 |
| 5,475,843 A | 12/1995 | Halviatti et al. | |
| 5,483,468 A | 1/1996 | Chen et al. | 364/551.01 |
| 5,491,791 A | 2/1996 | Glowny et al. | 395/183.13 |
| 5,504,921 A | 4/1996 | Dev et al. | 395/800 |
| 5,506,955 A | 4/1996 | Chen et al. | 395/183.02 |
| 5,513,126 A | 4/1996 | Harkins et al. | 364/514 A |
| 5,553,235 A | 9/1996 | Chen et al. | 395/182.18 |
| 5,555,191 A | 9/1996 | Hripcsak | 364/514 R |
| 5,572,672 A | 11/1996 | Dewitt et al. | 395/184.01 |
| 5,581,482 A | 12/1996 | Wiedenman et al. | 364/551.01 |
| 5,581,696 A | 12/1996 | Kolawa et al. | 395/183.14 |
| 5,586,254 A | 12/1996 | Kondo et al. | 395/200.1 |
| 5,598,429 A | 1/1997 | Marshall | 375/210 |
| 5,615,135 A | 3/1997 | Waclawsky et al. | 364/551.01 |
| 5,615,323 A | 3/1997 | Engel et al. | 395/140 |
| 5,616,904 A | 4/1997 | Fernadez | 235/449 |
| 5,619,656 A | 4/1997 | Graf | 395/200.11 |
| 5,621,663 A | 4/1997 | Skagerling | 364/550 |
| 5,634,009 A | 5/1997 | Iddon et al. | 395/200.11 |
| 5,636,344 A | 6/1997 | Lewis | 395/200.11 |
| 5,655,081 A | 8/1997 | Bonnell et al. | 395/200.32 |
| 5,661,668 A | 8/1997 | Yemini et al. | 364/550 |
| 5,668,944 A | 9/1997 | Berry | 395/184.01 |
| 5,675,510 A | 10/1997 | Coffey et al. | 364/514 A |
| 5,684,945 A | 11/1997 | Chen et al. | 395/182.18 |
| 5,696,486 A | 12/1997 | Poliquin et al. | 340/506 |
| 5,696,701 A | 12/1997 | Burgess et al. | 364/551.01 |
| 5,699,403 A | 12/1997 | Ronnen | 379/32 |
| 5,732,273 A | 3/1998 | Srivastava et al. | |
| 5,740,441 A | 4/1998 | Yellin et al. | |
| 5,748,098 A | 5/1998 | Grace | 340/825.16 |
| 5,752,062 A | 5/1998 | Gover et al. | 355/800 |
| 5,758,071 A | 5/1998 | Burgess et al. | 395/200.5 |
| 5,778,230 A | 7/1998 | Wimble et al. | 395/704 |
| 5,796,663 A | 8/1998 | Park et al. | 365/200 |
| 5,799,154 A | 8/1998 | Kuriyan | 395/200.53 |
| 5,802,256 A | 9/1998 | Heckerman et al. | 395/75 |
| 5,815,718 A | 9/1998 | Tock | |
| 5,819,028 A | 10/1998 | Manghirmalani et al. | 395/185.1 |
| 5,845,125 A | 12/1998 | Nishimura et al. | 395/704 |
| 5,850,388 A | 12/1998 | Anderson et al. | 370/252 |
| 5,870,540 A | 2/1999 | Wang et al. | 395/183.19 |
| 5,896,536 A | 4/1999 | Lindsey | 395/704 |
| 5,901,315 A | 5/1999 | Edwards et al. | 395/704 |
| 5,923,834 A | 7/1999 | Thieret et al. | 395/183.01 |
| 5,948,113 A | 9/1999 | Johnson et al. | 714/38 |
| 5,956,662 A | 9/1999 | Hemker et al. | 702/182 |
| 5,974,237 A | 10/1999 | Shurmer et al. | 395/200.54 |
| 5,974,457 A | 10/1999 | Waclawsky et al. | 709/224 |
| 5,978,594 A | 11/1999 | Bonnell et al. | 395/837 |
| 5,987,249 A | 11/1999 | Grossman et al. | 395/704 |
| 5,991,881 A | 11/1999 | Conklin et al. | 713/201 |
| 6,021,437 A | 2/2000 | Chen et al. | 709/224 |
| 6,026,234 A | 2/2000 | Hanson et al. | 395/704 |
| 6,026,237 A | 2/2000 | Berry et al. | 395/704 |
| 6,028,842 A | 2/2000 | Chapman et al. | 370/235 |
| 6,042,614 A | 3/2000 | Davidson et al. | 717/4 |
| 6,044,335 A | 3/2000 | Ksendzov | 702/182 |
| 6,058,102 A | 5/2000 | Drysdale et al. | 370/252 |
| 6,058,393 A | 5/2000 | Meier et al. | 707/10 |
| 6,061,518 A | 5/2000 | Hoffman | 395/704 |
| 6,067,412 A | 5/2000 | Blake et al. | 395/672 |
| 6,072,777 A | 6/2000 | Bencheck et al. | 370/244 |
| 6,073,089 A | 6/2000 | Baker et al. | 702/185 |
| 6,076,083 A | 6/2000 | Baker | 706/52 |
| 6,081,797 A | 6/2000 | Hittt | 706/25 |
| 6,085,029 A | 7/2000 | Kolawa et al. | 395/183.14 |
| 6,106,572 A | 8/2000 | Halpern | 717/4 |
| 6,108,658 A * | 8/2000 | Lindsay et al. | 707/101 |
| 6,108,800 A | 8/2000 | Asawa | 714/47 |
| 6,115,393 A | 9/2000 | Engel et al. | 370/469 |
| 6,118,936 A | 9/2000 | Lauer et al. | 395/200.53 |
| 6,118,940 A | 9/2000 | Alexander, III et al. | 395/704 |
| 6,119,074 A | 9/2000 | Sarangapani | 702/185 |
| 6,119,247 A | 9/2000 | House et al. | 714/38 |
| 6,138,122 A | 10/2000 | Smith et al. | 707/103 |
| 6,139,198 A | 10/2000 | Danforth et al. | 395/704 |
| 6,145,121 A | 11/2000 | Levy et al. | 717/4 |
| 6,149,318 A | 11/2000 | Chase et al. | 395/704 |
| 6,151,701 A | 11/2000 | Humphreys et al. | 717/4 |
| 6,154,736 A | 11/2000 | Chickering et al. | 706/59 |
| 6,161,200 A | 12/2000 | Rees et al. | 714/38 |
| 6,167,398 A | 12/2000 | Wyard et al. | 707/5 |
| 6,182,022 B1 | 1/2001 | Mayle et al. | 702/182 |
| 6,182,157 B1 | 1/2001 | Schlener et al. | 709/318 |
| 6,216,119 B1 | 4/2001 | Jannarone | 706/26 |
| 6,222,652 B1 | 4/2001 | Roberts | 359/110 |
| 6,249,755 B1 | 6/2001 | Yemini et al. | 702/183 |
| 6,263,298 B1 | 7/2001 | Kerman et al. | 702/186 |
| 6,269,401 B1 | 7/2001 | Fletcher et al. | 709/224 |
| 6,320,585 B1 | 11/2001 | Engel et al. | 345/440 |
| 6,327,550 B1 | 12/2001 | Vinberg et al. | 702/186 |
| 6,327,677 B1 | 12/2001 | Garg et al. | 714/37 |
| 6,343,288 B1 * | 1/2002 | Lindsay et al. | 707/7 |
| 6,359,976 B1 | 3/2002 | Kalyanpur et al. | 379/134 |
| 6,377,907 B1 | 4/2002 | Waclawski | 702/182 |
| 6,381,306 B1 | 4/2002 | Lawson et al. | 379/32.01 |
| 6,405,250 B1 | 6/2002 | Lin et al. | 709/224 |
| 6,446,058 B1 | 9/2002 | Brown | 706/60 |
| 6,453,346 B1 | 9/2002 | Garg et al. | 709/224 |
| 6,466,929 B1 | 10/2002 | Brown et al. | 706/48 |
| 6,470,464 B2 | 10/2002 | Bertram et al. | 714/37 |
| 6,484,129 B2 | 11/2002 | Klein et al. | 702/186 |
| 6,505,246 B1 | 1/2003 | Land et al. | 709/224 |
| 6,513,065 B1 | 1/2003 | Hafez et al. | 709/224 |
| 6,553,366 B1 * | 4/2003 | Miller et al. | 707/2 |
| 6,865,295 B2 * | 3/2005 | Trajkovic | 382/170 |
| 2001/0052087 A1 | 12/2001 | Garg et al. | 714/37 |
| 2002/0012011 A1 | 1/2002 | Roytman et al. | 345/736 |
| 2002/0019870 A1 | 2/2002 | Chirashnya et al. | 709/224 |
| 2002/0049838 A1 | 4/2002 | Sylor et al. | 709/224 |
| 2002/0054169 A1 | 5/2002 | Richardson | 345/854 |
| 2002/0090134 A1 | 7/2002 | Van Zon | 382/181 |
| 2002/0095661 A1 | 7/2002 | Angel et al. | 717/130 |
| 2002/0111755 A1 | 8/2002 | Valadarsky et al. | 702/58 |
| 2002/0123865 A1 | 9/2002 | Whitney et al. | 702/189 |
| 2002/0133757 A1 | 9/2002 | Bertram et al. | 714/47 |
| 2002/0152185 A1 | 10/2002 | Satish et al. | 706/1 |
| 2002/0152304 A1 | 10/2002 | Collazo | 709/224 |
| 2002/0152305 A1 | 10/2002 | Jackson et al. | 709/224 |
| 2002/0158918 A1 | 10/2002 | Feibush et al. | 345/853 |
| 2002/0159386 A1 | 10/2002 | Grosdidier et al. | 370/229 |
| 2002/0165892 A1 | 11/2002 | Grumann et al. | 709/100 |
| 2002/0169870 A1 | 11/2002 | Vossler et al. | 709/224 |
| 2002/0173997 A1 | 11/2002 | Menard et al. | 705/7 |
| 2002/0174174 A1 | 11/2002 | Ramraj et al. | 709/203 |
| 2002/0183972 A1 | 12/2002 | Enck et al. | 702/186 |
| 2002/0184065 A1 | 12/2002 | Menard et al. | 705/7 |
| 2002/0184615 A1 | 12/2002 | Sumner et al. | 717/130 |
| 2002/0198879 A1 | 12/2002 | Schwarcz | 707/10 |
| 2002/0198985 A1 | 12/2002 | Fraenkel et al. | 709/224 |
| 2003/0005362 A1 | 1/2003 | Miller et al. | 714/27 |
| 2003/0009507 A1 | 1/2003 | Shum | 709/104 |
| 2003/0014692 A1 | 1/2003 | James et al. | 714/25 |
| 2003/0018241 A1 | 1/2003 | Mannheimer | 600/300 |
| 2003/0018494 A1 | 1/2003 | Bronstein et al. | 705/2 |
| 2003/0023712 A1 | 1/2003 | Zhao et al. | 709/223 |
| 2003/0028631 A1 | 2/2003 | Rhodes | 709/224 |

| | | | |
|---|---|---|---|
| 2003/0033404 A1 | 2/2003 | Richardson | 709/224 |

FOREIGN PATENT DOCUMENTS

| | | |
|---|---|---|
| EP | 0 508 386 A2 | 10/1992 |
| FR | 2 783 620 A | 3/2000 |
| WO | WO 96/12224 | 4/1996 |
| WO | WO 99/13427 A | 3/1999 |

OTHER PUBLICATIONS

Rosenberg et al., 'A Heuristic Framework for Source Policing in ATM Networks', Aug. 1994, IEEE Publicaiton, vol. 2, No. 4, pp. 387-397.*

Studer, 'Stochastic Taylor Expansions and Saddlepoint Approximation for Risk Management', Thesis Dissertation, Feb. 2001, pp. 1-155.*

Puzicha et al., 'Histogram Clustering for Unsupervised Segmentation and Image Retrieval', Jun. 1999, Elsevier Publication, pp. 1-15.*

Cuéllar, J, "Statistical Process Control for Nonnormally Distributed Variables Through the Use of Transformations," Advanced Semiconductor Manufacturing Conference and Workshop, 1991. ASMC 91 Proceedings. IEEE/SEMI 1991 Boston, MA, USA; Oct. 21-23, 1991, New York, NY, USA, IEEE, US, Oct. 21, 1991, pp. 143-148.

Enigineering Statistical Handbook, Online, "Anderson-Darling Test," Apr. 17, 2001, pp. 1-5.

Engineering Statistical Handbook, Online, "Chi Square Goodness-of-Fit Test," Jun. 25, 2001, pp. 1-5.

Engineering Statistical Handbook, Online, "What are Moving Average or Smoothing Techniques?," Jul. 13, 2001, pp. 1-4.

Lee, J.L., "Application of Statistical Process Control Methods to the Establishment of Process Alarms in a Distributed Process Control System," ISA Transactions, Instrument Society of America. Pittsburgh, US, vol. 30, No. 1, 1991, pp. 59-64.

Wheeler D.J. et al., "Understanding Statistical Process Control," Chapters 3-4, 1986, Statistical Process Controls, Inc., Knoxville, Tennessee, USA, pp. 41-97.

Rundensteiner, E.A., "Design Tool Integration Using Object-Oriented Database Views," IEEE, 1993, pp. 104-107.

Epstein et al., "Educator's Symposium-Introducing Object-orientedness into a Breadth-first Introductory Curriculum," OOPSLA 1992, Addendum to the Proceedings, Vancouver, British Columbia, Canada, Oct. 5-10, 1992, pp. 293-298.

Parthasarathy, et al., "NetProf: Network-based High-level Profiling of Java Bytecode," The University of Rochester Computer Science Department, May 1996, pp. 1-15.

Han Bok Lee, "BIT: A Tool for Instrumenting Java Bytecodes," Department of Colorado Science, Aug. 1997, pp. 73-82.

"Jikes Bytecode Toolkit," IBM Internet Web-site, May 2000, pp. 1-2.

Thottan, et al., "Adaptive Thresholding for Proactive Network Problem Detection," Rensselaer Polytechnic Institute, Department of Electrical , Computer, and Systems Engineering.

Hellerstein, et al., "Characterizing Normal Operation of a Web Server: Application to Workload Forecasting and Problem Detection," Proceedings of the Computer Measurement Group, 1998.

Peterson, et al., "Fractal Patterns in DASD I/O Traffic."

Grummitt, Adam, "Automated Performance Management Advice Using Computational Intelligence," Metron Technology Limited.

Buzen, et al., "MASF—Multivariate Adaptive Statistical Filtering," BGS Systems, Inc.

Wheeler, Robert, E., "Quantile Estimators of Johnson Curve Parameters," E.I. du Pont de Nemours & Co.

Chou, et al., "Transforming Non-Normal Data to Normality in Statistical Process Control," Journal of Quality Technology, 1998, vol. 30, No. 2.

Shapiro, Samuel S., "How to Test Normality and Other distrubitonal Assumptions," American Society for Quality Control, Statistics Division, 1990.

DataMyte Handbook, "Non-Normal Distributions, Johnson Transformations," DataMyte Business, Allen-Bradley Company, Inc., Chapter 6, 1995.

Gunther, Neil J., "The Practical Perofrmance Analyst—Performance-By-Design Techniques for Distributed Systems," 1998, p. 12-15.

Walpole, et al., "Probability and Statistics for Engineers and Scientists," 1998, p. 213-215, 340-343.

DataMyte Handbook, "Control Charts," Chapter 2; "Constants for Calculating Control Limits," Appendix-Table A-1, DataMyte Business, Allen-Bradley Company, Inc., 1987.

Gilchrist, Warren G., "Statistical Modeling With Quantile Functions," chapter 1—An Overview, p. 1-17; chapter 2- Describing a Sample, p. 43-50, 2000.

Press, et al., "Numerical Recipes in C," Second Edition, chapter 6-Special Functions, p. 212-222; chapter 14- Statistical Description of Data—Nonparametric or Rank Correlation, p. 639-642, 1992.

Evans, et al., "Statistical Distributions," Third Edition, chapter 19-Gamma Distribution, p. 98-105, 2000.

Papoulis, Athanssios, "Probability, Random Variables, and Stochastic Processes," chapter 5—Functions of One Random Variable, p. 116-127, 1965.

Han, et al., "Datat Mining Concepts and Techniques," chapter 8-Cluster Analysis, p. -, 2001.

* cited by examiner

SYSTEM AND METHODS FOR DISPLAY OF TIME-SERIES DATA DISTRIBUTION

CROSS-REFERENCE TO RELATED CASES

This application claims priority to and the benefit of, and incorporates herein by reference, in its entirety, provisional U.S. patent application Ser. No. 60/322,021, filed Sep. 13, 2001. This application also incorporates herein by reference, in their entirety, U.S. patent application Ser. No. 10/186,401, filed Jul. 1, 2002, and Ser. No. 10/198,689, filed Jul. 18, 2002.

FIELD OF THE INVENTION

The invention relates to a system and methods for monitoring a set of metrics. More particularly, the invention provides a system and methods for computing and displaying data distribution information for metrics.

BACKGROUND OF THE INVENTION

Transactions are at the heart of e-business. Without fast, efficient transactions, orders dwindle and profits diminish. Today's e-business technology, for example, is providing businesses of all types with the ability to redefine transactions. There is a need, though, to optimize transaction performance and this requires the monitoring, careful analysis and management of transactions and other system performance metrics that may affect e-business.

Due to the complexity of modern e-business systems, it may be necessary to monitor thousands of performance metrics, ranging from relatively high-level metrics, such as transaction response time, throughput and availability, to low-level metrics, such as the amount of physical memory in use on each computer on a network, the amount of disk space available, or the number of threads executing on each processor on each computer. Metrics relating to the operation of database systems, operating systems, physical hardware, network performance, etc., all must be monitored, across networks that may include many computers, each executing numerous processes, so that problems can be detected and corrected when (or preferably before) they arise.

Due to the complexity of the problem and the number of metrics involved, it is useful to be able to quickly view information relating to one or more metrics across a period of time. In particular, viewing information on the frequency distribution of data may be useful. Such data distribution information generally may be viewed as a histogram, and many systems that perform statistical analysis are able to display histograms.

Unfortunately, there are a number of drawbacks to using conventional histograms to view time series data, such as the complex metrics discussed above. First, there is often a need to display multiple histograms on a screen when working with time series data, such as metrics. Each histogram typically requires a large amount of screen space, limiting the number of histograms that can be displayed at the same time.

Additionally, histograms are not always useful for discovering trends in data over time, since it may be difficult to see long-term trends in data by viewing a set of standard histograms side-by-side or stacked vertically. Some systems attempt to solve this problem by making the histograms small, and turning them on their side. Unfortunately, even when these steps are taken, it may be difficult to display more than five or six histograms on a single display. It would be impractical in such systems to display fifty or a hundred such histograms in a single display.

Another difficulty with using histograms to view data distribution information over a long period of time is the storage of histogram data. Typically, a large number of individual data samples are needed to construct a histogram. To display histograms for data over a long time period, there are two options available. First, a system can pre-compute the histogram for each required time interval, and save the histogram data. This approach requires many computations and storage of data that may never be used. Alternatively, a system can save all the individual data points over a long time period, so that histograms can be computed as they are needed. This approach requires a large amount of storage, and may require a large memory footprint and a large amount of computation when the histograms are generated. As a result, this approach may not be practical for long periods of time and large numbers of metrics.

Additionally, histograms are somewhat inflexible. For example, they cannot be effectively averaged or merged to condense the display of several time intervals into a single interval. Similarly, they cannot be effectively averaged or merged from multiple copies of the same metric collected from distinct but similar systems. Such data distribution information may be useful for viewing the health and status of an entire system using only a few displays or screens.

SUMMARY OF THE INVENTION

In view of the foregoing, there is a need for a system and methods for computing and displaying data distribution information for large sets of time-series data, such as metrics. Further, there is a need for a system and methods for efficiently storing, and merging such data distribution information.

In one aspect, the present invention provides a method for generating an approximate histogram of a data set. This is done by applying a quantile function on the data set to create a computational result, selecting a subset of the data set in response to the computational result, determining a condensed quantile function from the subset of the data set, and rendering the approximate histogram in response to the condensed quantile function.

In some embodiments, the subset of the data set includes at least one of a minimum value of the data set, a median value of the data set, and a maximum value of the data set.

In some embodiments, determining the condensed quantile function involves interpolating between values in the data set. In some such embodiments, the interpolation includes at least one of linear interpolation and polynomial interpolation.

In some embodiments, rendering the approximate histogram involves calculating an expected sample count based at least in part on an inverse of the condensed quantile function.

In some embodiments, the approximate histogram includes a plurality of bins. In these embodiments, the rendering step includes reducing the plurality of bins in the approximate histogram into a plurality of adjacent cells, and applying an indicium to each cell in response to the percentage of the data set within each cell. In some such embodiments, the indicium is visually discernable (e.g., a shade, texture, or color of the cell).

In another aspect, the invention provides a method of merging a plurality of data sets with reduced data storage requirements. This is accomplished by calculating a condensed quantile function for each data set, with each condensed quantile function supplying quantile values. Next, the quantile values are interleaved, and an inverse of each condensed quantile function is calculated at each interleaved quantile value. The average of the inverse of the condensed quantile functions at each interleaved quantile value are calculated, and a merged quantile function is defined as an inverse of the average of the inverse of the condensed quantile functions at each interleaved quantile value.

In some embodiments the plurality of data sets include data associated with a single variable from adjacent time intervals. In other embodiments, the plurality of data sets include data associated with a plurality of instances of a single variable from a single time interval.

Some embodiments further include a step of rendering a merged histogram in response to the merged quantile function. In some of these embodiments, rendering the merged histogram involves calculating an expected sample count based at least in part on an inverse of the merged quantile function. In some embodiments, the step of rendering the merged histogram includes reducing a plurality of bins in the merged histogram into a plurality of adjacent cells, and applying an indicium to each cell in response to a percentage of the data set within each cell. In some such embodiments, the indicium is visually discernable.

In a further aspect, the invention provides a method of optimizing performance in a distributed transaction system. This is accomplished by collecting data associated with at least one system performance metric, and applying a quantile function on the data to create a computational result. Next, a subset of the data is selected in response to the computational result, and a condensed quantile function is determined from the subset of the data. The method also includes rendering at least one approximate histogram in response to the condensed quantile function, identifying at least one trend in the approximate histogram, and adjusting, on an as-needed basis, operation of the distributed transaction system to modify the trend.

In some embodiments, the methods of the invention can be implemented in software, or in logic or other hardware. When the methods are implemented in software, the software may be made available to developers and end users online and through download vehicles. It may also be embodied in an article of manufacture that includes a program storage medium such as a computer disk or diskette, a CD, DVD, or computer memory device.

Other aspects, embodiments, and advantages of the present invention will become apparent from the following detailed description which, taken in conjunction with the accompanying drawings, illustrating the principles of the invention by way of example only.

BRIEF DESCRIPTION OF THE DRAWINGS

The foregoing and other objects, features, and advantages of the present invention, as well as the invention itself, will be more fully understood from the following description of various embodiments, when read together with the accompanying drawings, in which.

In the drawings, like reference characters generally refer to the same parts throughout the different views. The drawings are not necessarily to scale, emphasis instead being placed on illustrating the principles of the invention.

DETAILED DESCRIPTION OF THE INVENTION

Figure 1:
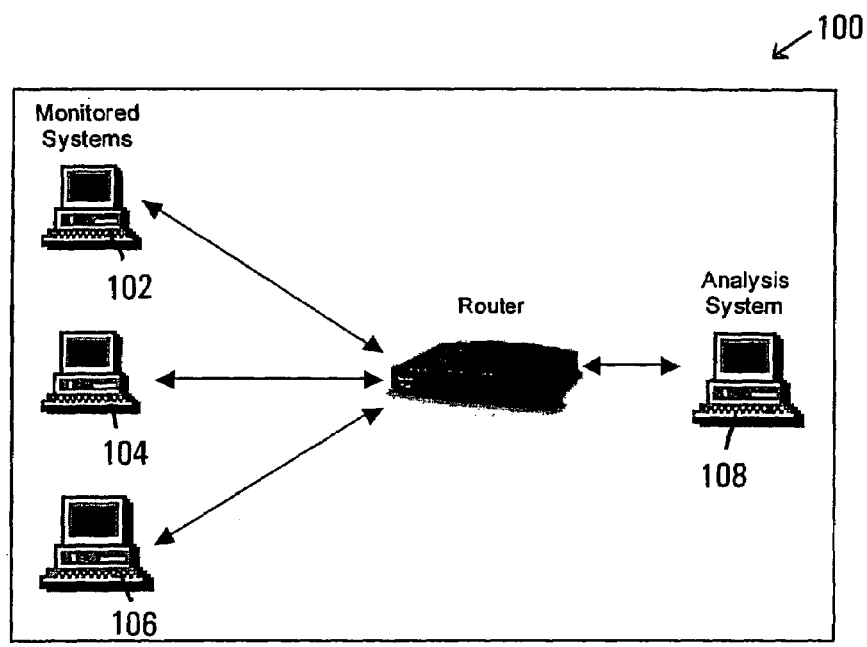
FIG. 1 shows an example of a system that may be monitored using the system and methods of the invention.

As shown in the drawings for the purposes of illustration, the invention may be embodied in a system that collects, analyzes, and reports performance metrics for systems such as, for example, complex transaction-based structures typified by (but not limited to) e-commerce systems. In broad overview, the invention relates to the monitoring of a set of system performance metrics, such as transaction response time, throughput, availability, etc. The system receives metric data and generates and displays a set of "approximate histograms" from the quantile function of a time series segment. An approximate histogram is an estimation of the histogram of an original (i.e., complete) data set.

In addition to generating "approximate histograms," an embodiment of the invention also displays a set of histograms for successive time intervals using a set of offset stacked bar charts. The resulting display provides a useful visual tool for tracking changes in the central values of a metric and for detecting subtle changes in its frequency distribution over long time scales. Due to the use of approximate histograms, this is accomplished without the need to store a large number of individual samples over long periods of time.

Based on the data monitored and displayed, an end user is able to identify trends and other indicia (e.g., threshold alarm notification) of system performance. The information displayed (e.g., response time, throughput, and availability) can indicate that certain transactions are not occurring as expected. Consequently, an end user is able to act to determine and remedy the root cause of transaction problems before they become critical.

The system and methods of the present invention are described herein as applying to software for use by a system manager, such as an e-business system manager, to assist, for example, in the achievement and maintenance of Service Level Agreements in terms of system performance. It will be understood that the system and methods of the present invention are not limited to this application, and can be applied to the storage and display of histogram data in most any system whose operation can be described through use of a set of system metrics.

FIG. 1 shows an example of a system 100 that may be monitored using the system and methods of the present invention. Various system metrics are collected on one or more of monitored systems 102, 104, and 106. These metrics are then sent via a network or other communications means to analysis system 108. On analysis system 108, the metrics are analyzed and displayed in accordance with the system and methods of the invention.

Figure 2:
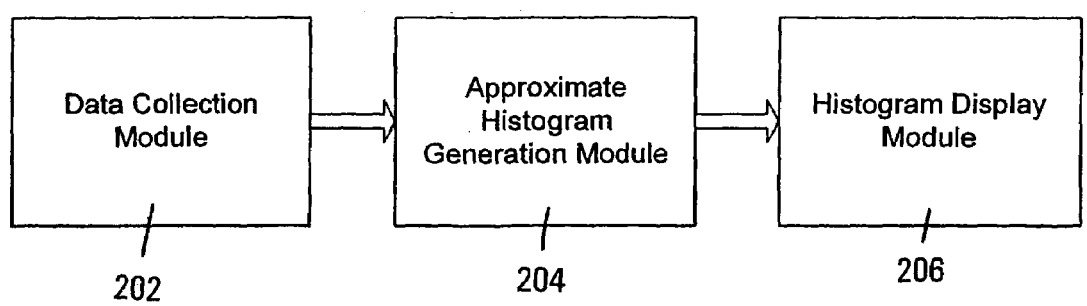
FIG. 2 is a block diagram showing a high-level overview of an embodiment of the system and methods of the invention.

In FIG. 2, a high-level overview of the system 200 of the present invention is shown. Data collection module 202 collects metric data from numerous sources, and makes the metric data available to approximate histogram generation module 204. It will be understood that data collection module 202 may be a part of a larger metric collection and analysis system, and that generally, the system and methods of the invention may be built in to such a collection and analysis system. Alternatively, the system and methods of the invention may be implemented in software that interoperates with a metric data collection and analysis system, without being integrated into the metric data collection and analysis system.

Approximate histogram generation module 204 uses the methods detailed below to generate approximate histograms for the data. Using these techniques, it is possible to store histogram data over a long period of time without requiring large amounts of storage space. As will be described in detail below, this is done by generating and storing condensed quantile tables, from which approximate histograms for the data may be generated. Approximate histogram generation module 204 is able to aggregate histogram data by merging the condensed quantile tables.

Histogram display module 206 displays histogram data as "stack-bar" histograms, which will be described in detail below. Use of these stack-bar histograms permits multiple histograms to be displayed at once without requiring a large amount of screen space. Additionally scaled stack-bar histograms can be displayed for multiple time intervals, permitting an operator to view trends in the histogram data associated with a metric.

Figure 3A:
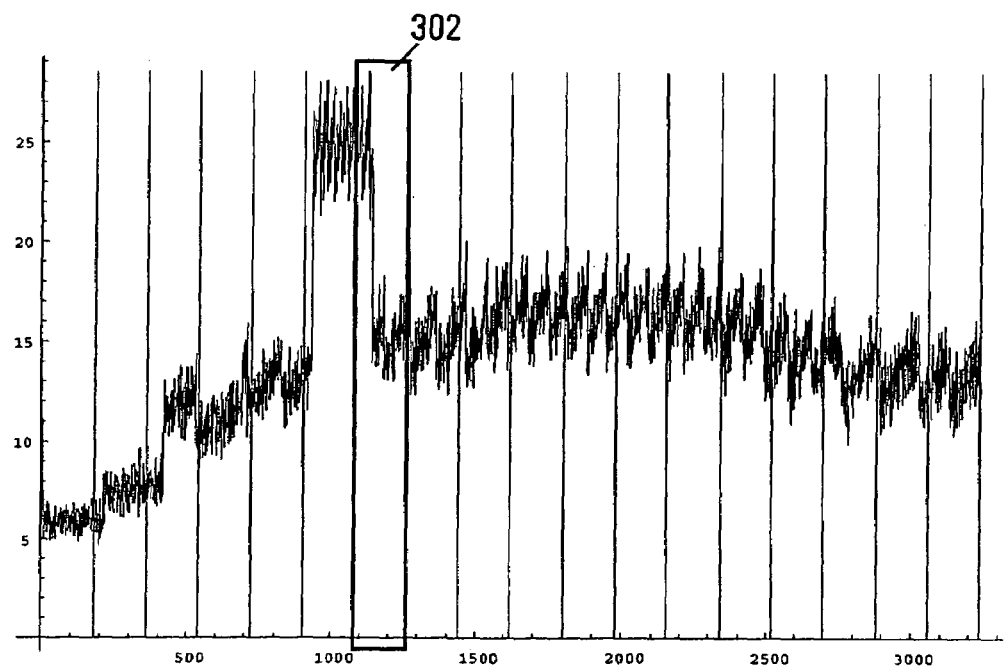
FIGS. 3A–3B show example plots of data points to be analyzed according to an embodiment of the invention.
Figure 3B:
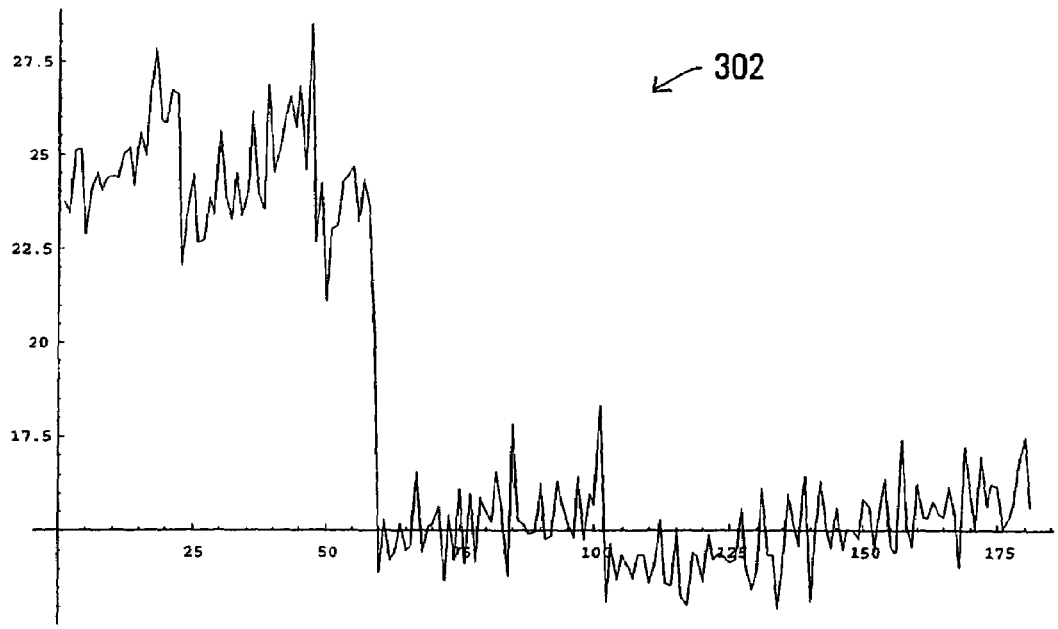

In operation, data collection module 202 collects N Data points for a metric over each time interval T. For example, N may be 900 points over a T=15 minute interval. FIG. 3A shows an example plot of data points for 18 intervals where N=180 and T=30. Vertical lines mark the borders of each 30-minute time interval in FIG. 3A. FIG. 3B shows an expanded view of the 180 data points in time interval 302, which is highlighted in FIG. 3A. The data shown in FIGS. 3A and 3B will be used throughout the following examples.

Once the data is collected, it is processed by an approximate histogram generation module, as described below.

Generating an Approximate Histogram

This section presents a method for generating an approximate histogram from the quantile function of a condensed data set. This is useful as a data compression technique because a small number of data points from the quantile function can retain much information about the distribution of a data set. As will be described, a histogram can be re-constructed from the condensed quantile points. Such a re-constructed histogram is referred to as an approximate histogram.

In general, four basic functions are involved in generating the approximate histogram: the histogram, the probability density function, the cumulative distribution function and the quantile function. The relationship between these functions provides a basis for the method, as described below.

Figure 4:
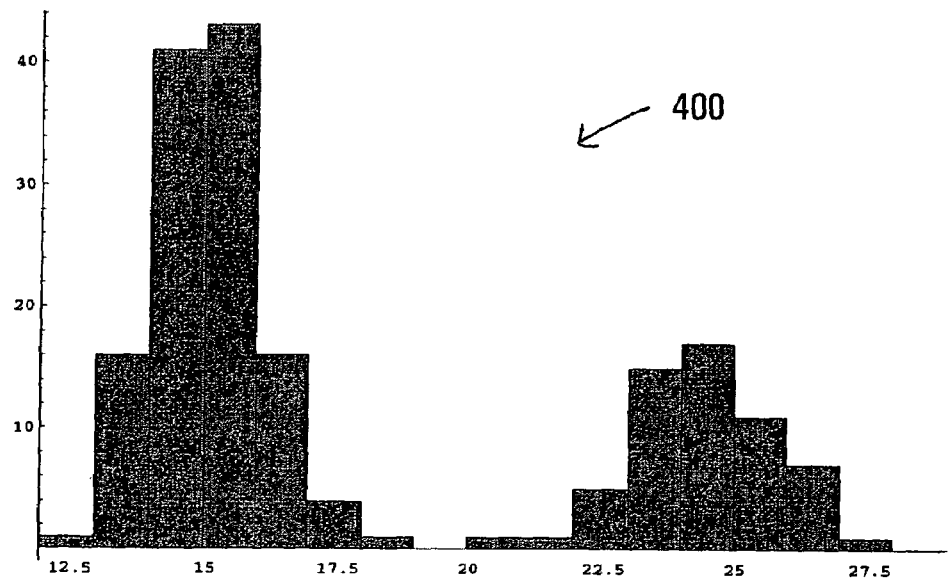
FIG. 4 shows an example histogram of the data points of FIG. 3B.

FIG. 4 shows a histogram 400 of the data points shown in FIG. 3B. Generally, a histogram is a plot of the frequency distribution of values within a given range. The histogram 400 is divided into bins of equal width. The height of each bin represents the number of point values that fall between the minimum and maximum limits for that bin. Generating such a histogram is typically accomplished by determining the number of bins, determining the minimum and maximum limits for each bin, and determining which bin each data point would be in, based on the minimum and maximum limits.

Typically, all of the data points are needed to regenerate the histogram 400. Thus, unless histograms are pre-computed and saved, a large amount of data must be stored to produce a histogram on demand.

Figure 5:
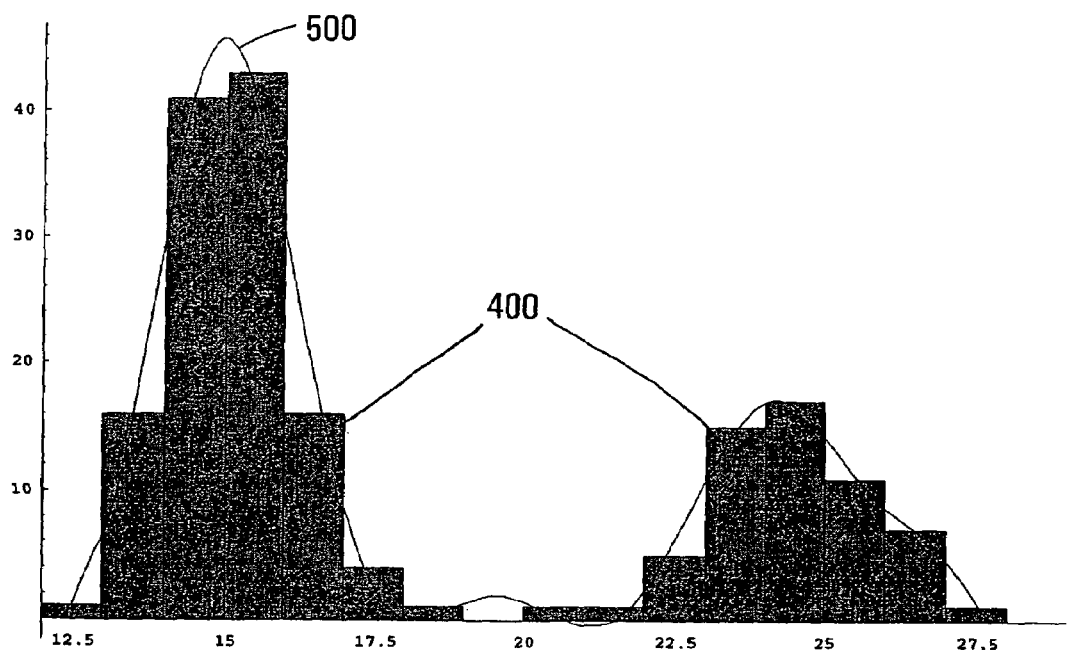
FIG. 5 shows an example estimated probability density function for the data shown in FIG. 3B.
Figure 6:
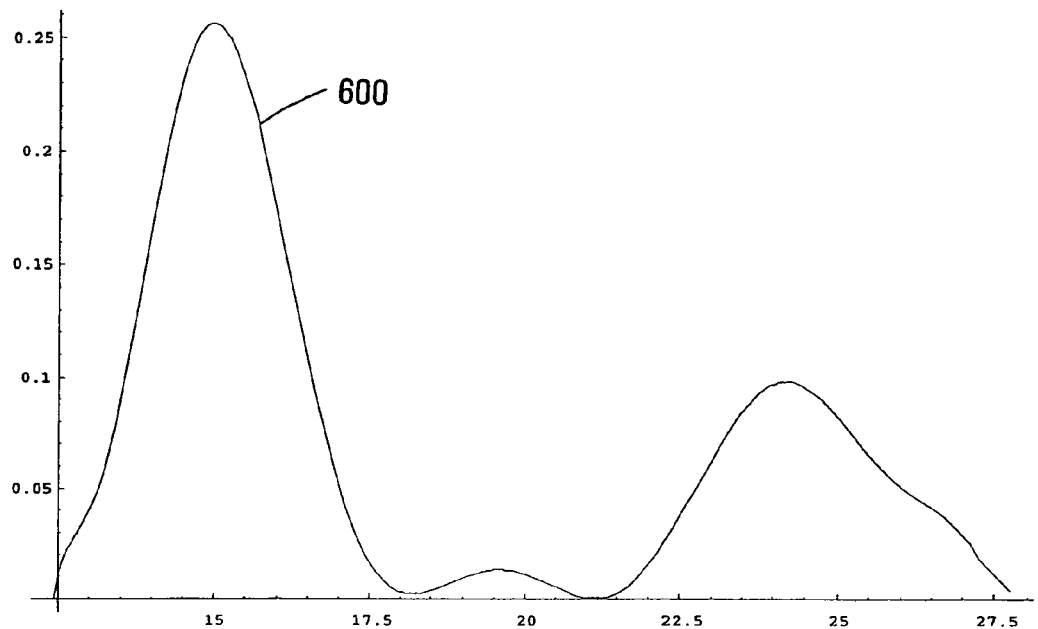
FIG. 6 shows an example of a normalized estimated probability density function.

Referring now to FIG. 5, an estimated Probability Density Function (PDF) 500 for the data of FIG. 3B is shown, superimposed on the histogram 400. The PDF 500 is a function representing the probability, expressed as p=f(v), that a value will fall close to v. The PDF 500 can be estimated by constructing a smooth curve that passes through the top of the histogram bins. The distribution of the data in this example does not follow either a Gaussian distribution or any other simple mathematical form. FIG. 6 shows the normalized estimated PDF 600, scaled so that the total area under the curve equals 1.0. A possible polynomial fit for the estimated PDF 600 is:

$$f(v)=0.000058556v^9-0.00353074v^8+0.14075v^7-3.89408v^6+76.2797v^5-1057.71v^4+10172.4v^3-64611.8v^2+243906.0v-414515$$

Figure 7:
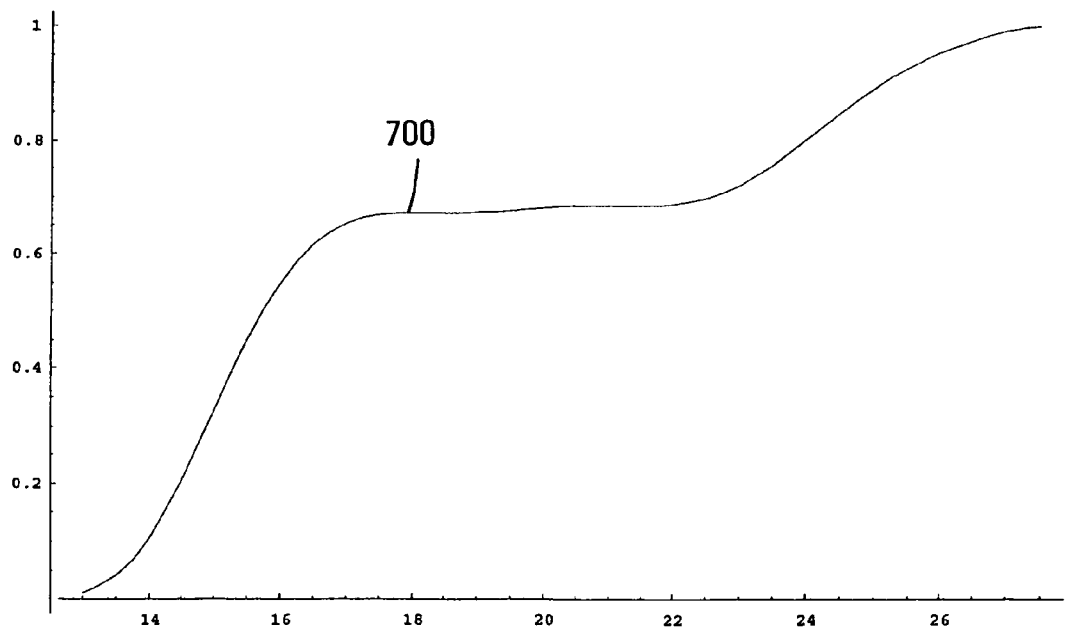
FIG. 7 shows an example of an estimated cumulative distribution function.

FIG. 7 shows the estimated cumulative distribution function (CDF) 700 of the example data. The CDF 700, F(v), gives the probability that a sample random variable $v_i$ will be less than the given value v. Alternatively, F(v) can be viewed as the portion of a large sample set of the random variable x that will be less than v. Generally, the CDF 700 is computed as the integral of the PDF:

$$F(v) = P(x \leq v) = \int_{-\infty}^{v} f(x)dx \qquad \text{(Eq. 1)}$$

A possible resulting polynomial for the CDF 700 is:

$F(v) = 5.8556 \times 10^{-6} v^{10} - 0.000392304 v^9 + 0.0175938 v^8 - 0.556297 v^7 + 12.7133 v^6 - 211.542 v^5 + 2543.09 v^4 - 21537.3 v^3 + 121953 v^2 - 414515 v$ Note that an estimated histogram of the underlying data can be generated from the CDF. The probability that a value will fall between a lower bin limit, vl, and an upper bin limit, vh, may be computed using the CDF, F(v), as follows:

$$P(vl < v \leq vh) = F(vh) - F(vl) \qquad \text{(Eq. 2)}$$

Where:
F(v) is the CDF;
vh is the upper bin limit; and
vl is the lower bin limit.

Thus, the expected value of the number of samples that will fall in a bin, j, is:

$$N_j = N \ast (F(vh_j) - F(vl_j)) \qquad \text{(Eq. 3)}$$

Where:
$N_j$ is the expected number of samples in the $j^{th}$ bin;
N is the total number of data points;
F(v) is the CDF;
$vh_j$ is the upper bin limit for the $j^{th}$ bin; and
$vl_j$ is the lower bin limit for the $j^{th}$ bin.

Figure 8:
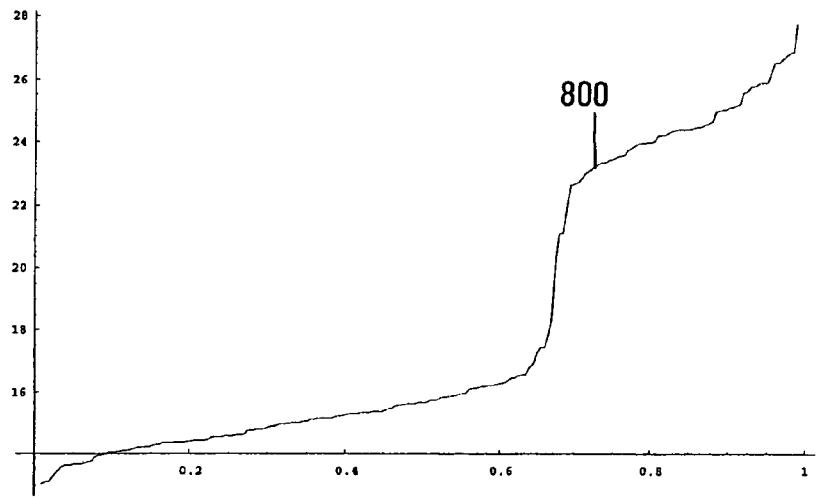
FIG. 8 shows an example quantile function estimated from the example data shown in FIG. 3B.

FIG. 8 shows the quantile function 800 estimated from the example data of FIG. 3B. Generally, a quantile function, such as that shown in FIG. 8 can model any arbitrary distribution. The quantile function maps a probability p, to a value v, such that p is the probability that a value $v_k$ taken from a similar data set will be less than v. The quantile function Q is the inverse of the CDF. That is:

$v = Q(p)v$ such that $P(v_k \leq v) = p$.

$$Q(p) = F^{-1}(p) \qquad \text{(Eq. 4)}$$

A condensed quantile function may be generated by selecting a subset of the data points from the quantile function. For example, 13 points may be selected from the complete data set, including the minimum, median and maximum values. For the quantile function 800 of FIG. 8, the values might be:

| P | V | |
|---|---|---|
| Min | 12.9587 | |
| 0.05 | 13.6785 | |
| 0.15 | 14.2774 | |
| 0.25 | 14.5957 | |
| 0.35 | 15.0723 | |
| 0.45 | 15.4357 | |
| 0.50 | 15.6944 | Median |
| 0.55 | 15.9530 | |
| 0.65 | 17.2503 | |
| 0.75 | 23.4571 | |
| 0.85 | 24.4150 | |
| 0.95 | 25.8885 | |
| Max | 28.5020 | |

Where P is an estimate of the probability that a randomly chosen value ($v_k$) will be less than the value V.

Figure 9:
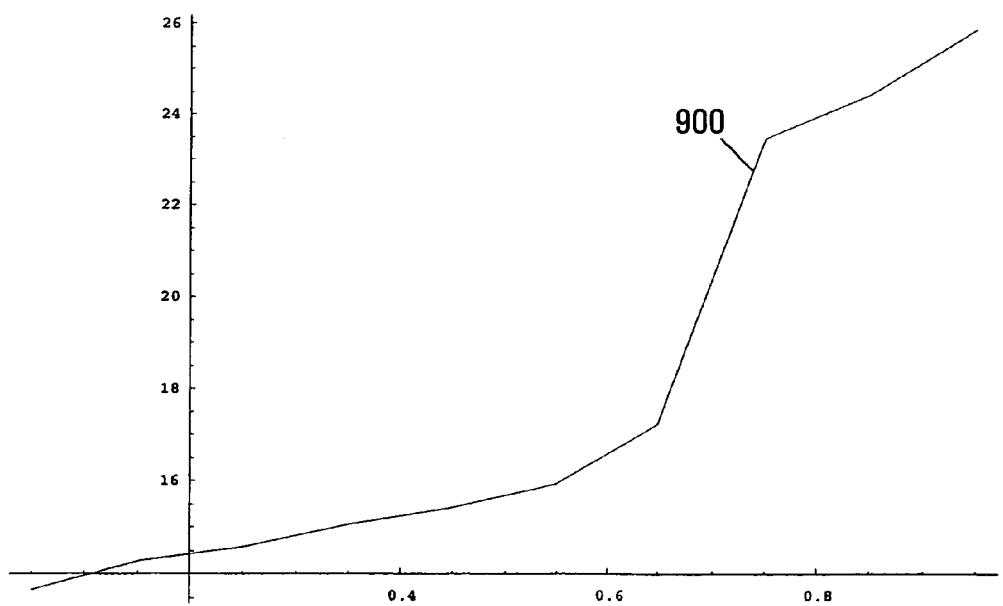
FIG. 9 shows an example of a condensed estimated quantile function.

FIG. 9 shows a condensed estimated quantile function 900 plotted from the 13 quantile points shown above. The shape of the condensed quantile function shown in FIG. 9 is close to the shape of the quantile function shown in FIG. 8, which was based on the full 180 data points.

Figure 10:
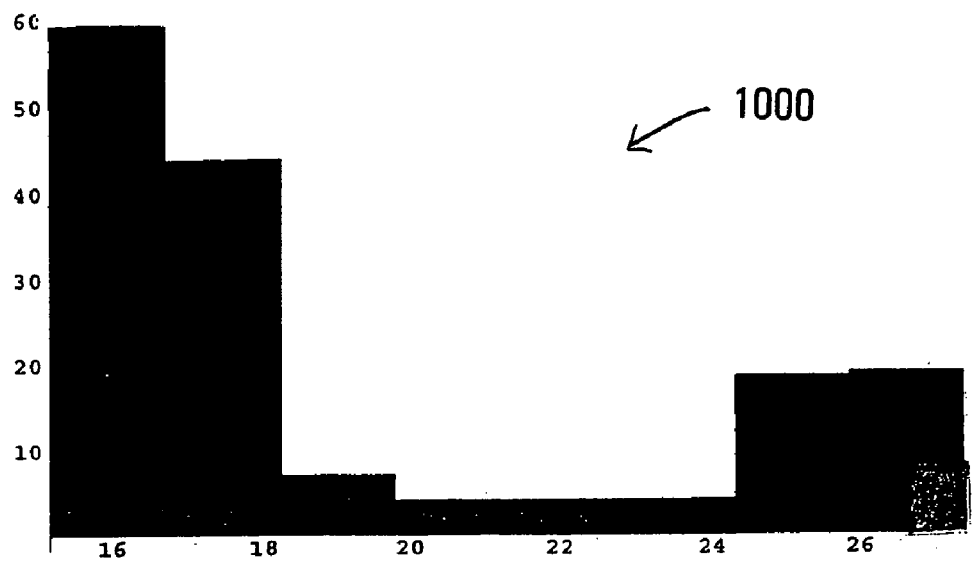
FIG. 10 shows an example of an approximate histogram that has been reconstructed from the condensed estimated quantile function of FIG. 9 according to an embodiment of the invention.

As discussed above, an estimated histogram may be generated from a CDF, which is the inverse of the quantile function. Thus, an approximate histogram may be generated based on the inverse of the condensed estimated quantile function. FIG. 10 shows a histogram 1000 that has been reconstructed from the condensed estimated quantile function of FIG. 9. For this example, the histogram bin limits are equally spaced between the 5% and 95% quantile points.

Figure 11:
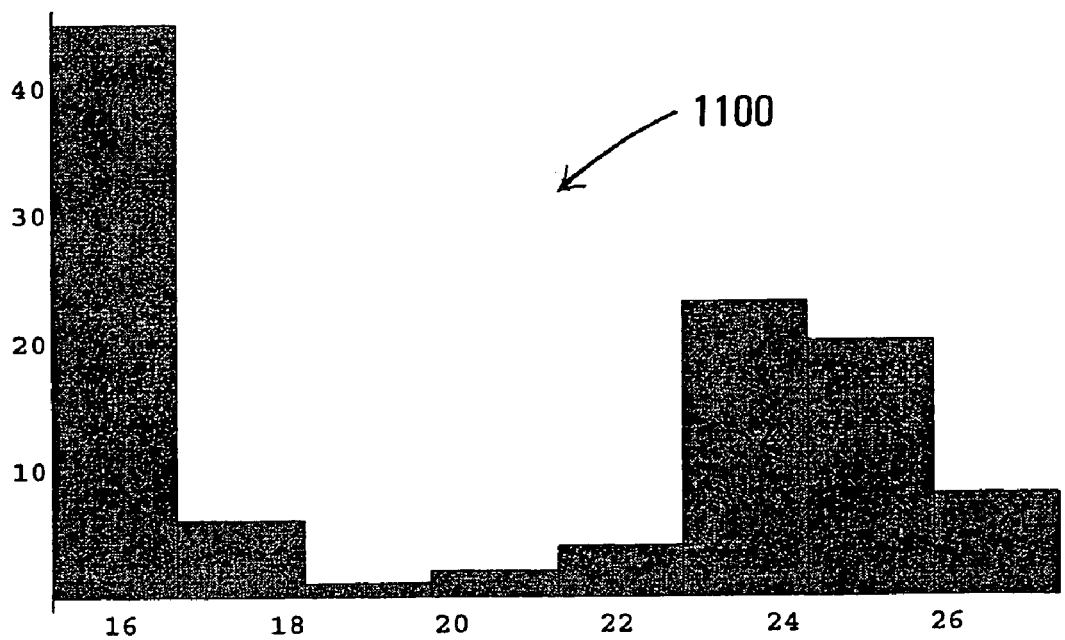
FIG. 11 shows an example histogram of a full set of data points, for comparison with the estimated histogram of FIG. 10.

FIG. 11 shows a similar histogram 1100 (with bins equally spaced between the 5% and 95% quantile points) for the full set of data points. As can be seen, the shape of the reconstructed histogram 1000 of FIG. 10 is similar to the shape of the histogram 1100 based on the original data, shown in FIG. 11. This confirms the value of this reconstruction technique, and demonstrates that, in accordance with the invention, a reasonable approximate histogram may be generated from relatively few points of a condensed estimated CDF.

Note that the histogram 1100 in FIG. 11 has a different appearance than the histogram 400 in FIG. 4, even though they are based on the same data. This is because the 16 bin limits in FIG. 4 are evenly spaced between the minimum and maximum values whereas the 8 bin limits in FIG. 11 are evenly spaced between the 5% and 95% quantile points for comparison with the reconstructed approximate histogram 1000 shown in FIG. 10.

Use of a condensed estimated quantile function, as discussed above, can provide numerous benefits. First, because far fewer points are needed to generate histograms from condensed estimated quantile functions than from the original data, the amount of memory and the number of calculations that are needed to produce histograms are greatly reduced. Because of the reduced number of calculations that are needed, it is possible to quickly compute numerous histograms, representing large amounts of data. Additionally, use of condensed estimated quantile functions can provide substantial savings of storage space. For example, to store 24 hours of raw, one-second samples would require 24 hr.×3600 sec./hr., or 86,400 storage locations. In contrast, the storage of 96 condensed quantile functions of thirteen points each, providing one such quantile function for each fifteen minute interval, would requires only 96×13=1248 storage locations.

The functions outlined in the above example provide the basis for generating an approximate histogram. As will be shown below, in an embodiment of the invention, the process is implemented in an efficient manner, in which a quantile function is directly estimated from the data.

Figure 12:
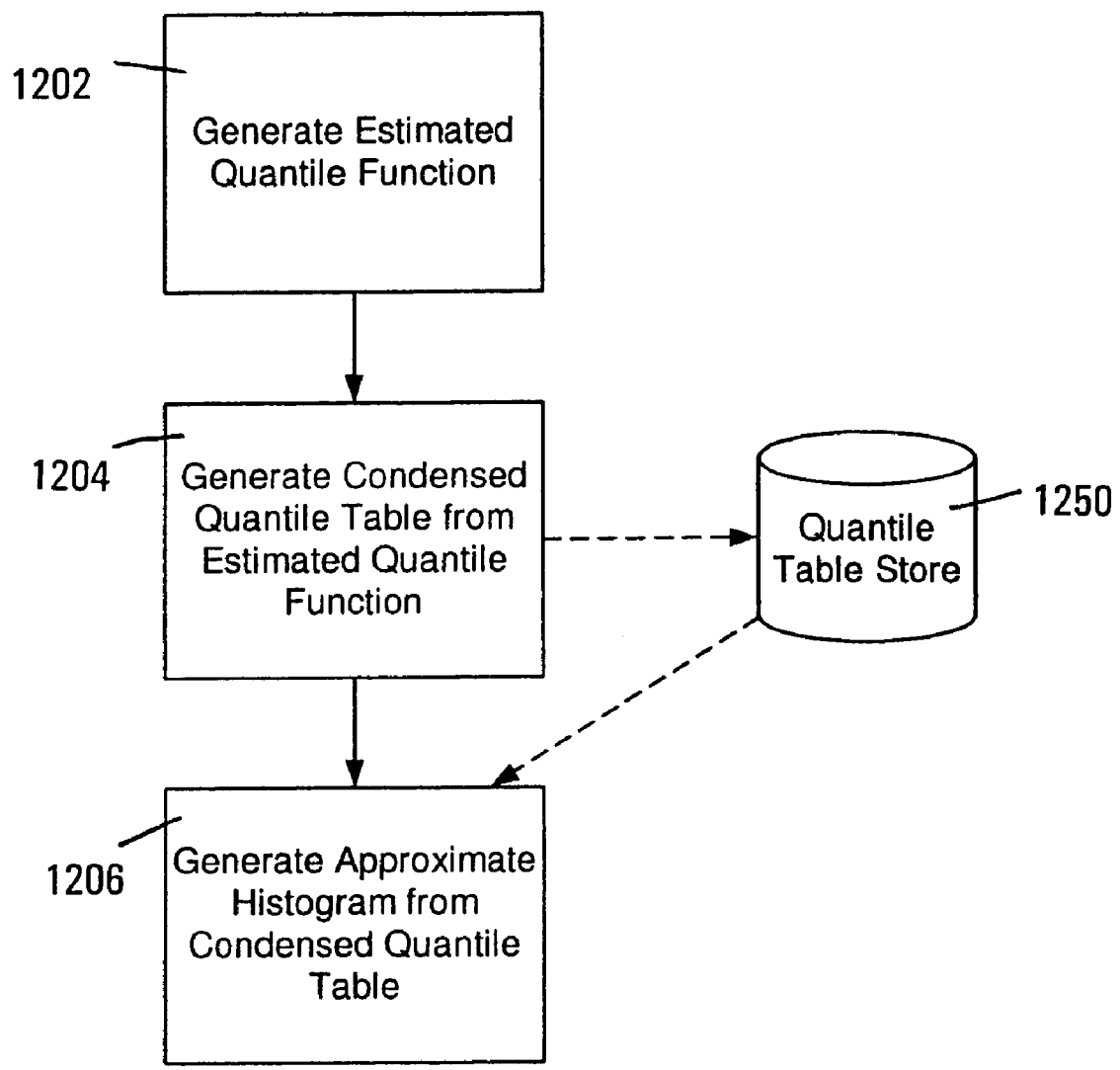
FIG. 12 is a block diagram of a method for generating an approximate histogram in accordance with an embodiment of the invention.

Referring to FIG. 12, a high-level block diagram of a method 1200 for generating an approximate histogram is shown. First, in step 1202, an estimated quantile function for the data is generated from the individual samples in a time interval. Next, in step 1204, a condensed quantile table is produced from the estimated quantile function by choosing a relatively small number of points from the estimated quantile function. At this stage, the condensed quantile table may be stored in the quantile table store 1250, which may be a file, a database, or any other form of storage. Next, in step 1206, a condensed quantile table, which optionally may be read from quantile table store 1250, is used to generate an approximate histogram. Each of these steps will be detailed below.

At step 1202, the system generates an estimated quantile function from the samples of a time interval. In general, the estimated quantile function associates a value (v), with the portion (p) of all values that are less than v. The portion (p) is an estimate of the probability that a randomly chosen value ($v_k$) will be less than the value (v). The quantile function takes the probability or portion (p) as input and returns the value (v).

$$v = Q(P)v \text{ such that } P(v_k \leq v) = p.$$

Given a set of N values (i.e., N samples from a time interval), the estimated quantile function may be constructed, for example, by sorting the set of values ($v_i$) into ascending order. This may be done incrementally as the data is collected using, for example, an insertion sort. If the data is already available it may be sorted efficiently with any number of standard techniques including Quicksort or with a merge sort, depending on the sorting performance and stability sought.

Next, for each sorted value $v_i$ (where i is in the range 0 to N−1), a pseudo-probability $p_i$ is assigned as follows:

$$p_i = (i+0.5)/N \quad \text{(Eq. 5)}$$

Where:
i=the index (0 to N−1) of the sample in the sorted list; and
N=the total number of values This process will produce a set of N ($p_i$, $v_i$) pairs, where the $p_i$ values are evenly spaced. These ($p_i$, $v_i$) pairs form an estimated quantile function for the data.

In step 1204, to reduce storage requirements, in accordance with and embodiment of the invention, only some of the sample quantile function points are stored as a condensed quantile table. To maintain the maximum amount of information, these points, or sub-samples could be more closely spaced where the quantile function has high curvature, and farther apart where there is less curvature. An algorithm to select such sub-samples will be described in detail below, with reference to FIG. 13.

A strategy for selecting sub-samples that will work for many applications is to evenly space the sub-samples. This also eliminates the need to store the probabilities, since they are implicit (i.e., they are evenly spaced).

Given N samples, M evenly spaced sub-samples, $ps_k$ may be chosen. For suitable values of N and M, the indices of the sub-samples may be chosen as follows:

$$dp = 1/(M-1)$$
$$ps_0 = dp/2$$
$$ps_{j+1} = ps_j + dp$$
$$vs_j = Q(ps_j)$$

Where:
dp=the change in the sub-sample probability for each of the (evenly spaced) $ps_j$;
$ps_0$=the first sub-sample probability;
$ps_j$=the sub-sample probabilities, where j=0 to M−1; and
$vs_j$=the sub-sample quantile values, where j=0 to M−1.

To ensure that the median is captured when M is odd, the value of the middle quantile point may be set to Q(0.5). When M is odd, the middle index is (M−1)/2.

In general, the sub-sample probabilities ($ps_k$) will not correspond to the original sample probabilities ($p_i$). For example if ps equals 0.5 and there are an even number of samples N, then Q(0.5) will be the average of sample $v_{N/2-1}$ and $v_{N/2}$. So Q(ps) must be calculated by interpolation for any (ps) that falls between two points in the estimated quantile function table.

As an example, let N=900 and M=11, then the probabilities and corresponding quantile points that make up the condensed quantile table would be as follows:

| | | | | |
|---|---|---|---|---|
| $ps_0$ = | 0.05 | $vs_0$ = | Q(0.05) | |
| $ps_1$ = | 0.15 | $vs_1$ = | Q(0.15) | |
| $ps_2$ = | 0.25 | $vs_2$ = | Q(0.25) | |
| $ps_3$ = | 0.35 | $vs_3$ = | Q(0.35) | |
| $ps_4$ = | 0.45 | $vs_4$ = | Q(0.45) | |
| $ps_5$ = | 0.50 | $vs_5$ = | Q(0.50) | Median |
| $ps_6$ = | 0.55 | $vs_6$ = | Q(0.55) | |
| $ps_7$ = | 0.65 | $vs_7$ = | Q(0.65) | |
| $ps_8$ = | 0.75 | $vs_8$ = | Q(0.75) | |
| $ps_9$ = | 0.85 | $vs_9$ = | Q(0.85) | |
| $ps_{10}$ = | 0.95 | $vs_{10}$ = | Q(0.95) | |

The value of the quantile function Q(ps) can be calculated from the estimated quantile table (i.e., the ($p_i$, $v_i$) pairs) by interpolation. First, the system finds the index in the table that has the probability value closest to (ps). This can be done by inverting the pseudo probability function. Given that $$p_i = (i+0.5)/N$$

The indices (i0,i1) that correspond to the interval containing (ps) can be found as follows:

$$i0 = \text{IntegerPart}(ps*N - 0.5) \quad \text{(Eq. 6)}$$

$$i1 = i0 + 1 \quad \text{(Eq. 7)}$$

The value of Q(ps) is then computed using known linear interpolation techniques to interpolate a result between $v_{i0}$ and $v_{i1}$. If required, polynomial interpolation could be used for higher precision.

If N is large, the difference between $p_0$, ps and $p_1$ will be small. For example, if N=1000, the difference between $p_0$ and $p_1$ will be 0.001, and ps will be within 0.0005 of either $p_0$ or $p_1$. This leads to an even more accurate estimate of Q(ps) when N is large.

Thus, when the number of sorted samples (N) is large, the condensed quantile table can be constructed with little loss of accuracy by choosing samples of $v_i$ corresponding to the required probabilities $p_i$. Given that $$p_i = (i+0.5)/N$$

the index of the value closest to Q(ps) is:

$$i = \text{Round}(ps*N - 0.5)$$

Where the Round function rounds its input up if the fractional part of the input is 0.5 or larger, or down if the fractional part of the input is less than 0.5.

Thus, when N is large, Q(ps) ≈ $v_i$ for all required values of ps. The probability error ($e_p$) introduced by this method will be less than or equal to one-half of the difference between successive probabilities, i.e.:

$$e_p <= 0.5/N.$$

The corresponding quantile value error introduced is less than or equal to one-half of the maximum difference between two successive values, $v_i$, $v_{i+1}$.

If the values of M and N are such that the fractional part of [$p_i*N-0.5$] is close to 0.5, then an improvement in accuracy may be gained by averaging adjacent samples. For example, if N=900 and M=11, then the probabilities and corresponding quantile points that make up the condensed quantile table would be as follows (indices are given by equations 6 and 7):

| | | | | | |
|---|---|---|---|---|---|
| $ps_0 =$ | 0.05 | $vs_0 =$ | $Q(0.05)$ | $= (v_{44} + v_{45})/2$ | |
| $ps_1 =$ | 0.15 | $vs_1 =$ | $Q(0.15)$ | $= (v_{134} + v_{135})/2$ | |
| $ps_2 =$ | 0.25 | $vs_2 =$ | $Q(0.25)$ | $= (v_{224} + v_{225})/2$ | |
| $ps_3 =$ | 0.35 | $vs_3 =$ | $Q(0.35)$ | $= (v_{314} + v_{315})/2$ | |
| $ps_4 =$ | 0.45 | $vs_4 =$ | $Q(0.45)$ | $= (v_{404} + v_{405})/2$ | |
| $ps_5 =$ | 0.50 | $vs_5 =$ | $Q(0.50)$ | $= (v_{449} + v_{450})/2$ | Median |
| $ps_6 =$ | 0.55 | $vs_6 =$ | $Q(0.55)$ | $= (v_{494} + v_{495})/2$ | |
| $ps_7 =$ | 0.65 | $vs_7 =$ | $Q(0.65)$ | $= (v_{584} + v_{585})/2$ | |
| $ps_8 =$ | 0.75 | $vs_8 =$ | $Q(0.75)$ | $= (v_{674} + v_{675})/2$ | |
| $ps_9 =$ | 0.85 | $vs_9 =$ | $Q(0.85)$ | $= (v_{764} + v_{765})/2$ | |
| $ps_{10} =$ | 0.95 | $vs_{10} =$ | $Q(0.95)$ | $= (v_{854} + v_{855})/2$ | |

The estimated quantile function, condensed or not condensed, represents a set of samples that are an estimate of the inverse of the Cumulative Probability Distribution Function F(v) of the underlying data set. In step 1206, as discussed above, the approximate histogram is computed. This is done by finding the inverse of the condensed estimated quantile function, which is represented by the condensed quantile table, and using the inverse (which is an approximate CDF) to produce the approximate histogram.

To estimate the number of samples that would fall in a histogram bin, the inverse of the quantile function is used, evaluated at both bin limits. (The inverse of the quantile function is the probability that a randomly chosen value $V_k$ will be less than V.)

$$F(v) = Q^{-1}(v) = P(V_k \leq v).$$

The probability that a value will fall between vl and vh is computed as follows:

$$P(vl < v \leq vh) = Q^{-1}(vh) - Q^{-1}(vl)$$

The expected value of the number of samples to fall in the same range is:

$$Nj = N*(Q^{-1}(vh_j) - Q^{-1}(vl_j))$$

The histogram can be formed as the set of Nj computed using this formula. The set bin limits (vl, vh) are established at equal intervals over a reasonable range of values. For example, these could be from the lowest quantile point to the highest, or a certain number of inter-quantile ranges (IQR's) around the median. The resulting set of Nj will approximate the original histogram of the data set.

The inverse of the quantile function can be computed efficiently with a binary search method. This is because the quantile function is monotonic. Given a table of quantile function values ($ps_j$, $vs_j$), and a value (v) it is possible to find $Q^{-1}(v)$ using the following procedure (provided as pseudocode):

```
Repeat until p_mid converges on Q^-1(v):
    While Δp > Δmin:
        p_mid = (p_min + p_max )/2
        Δp = p_max - p_min
        v' = Q(p_mid)
        // note - if v' < then Q^-1(v) > p_mid, else Q^-1(v) < p_mid
        If (v' < v)
            p_min = p_mid
        Else
            p_max = p_mid
    End-if
    End-while
Return p_mid
```

Where:
v is the input value – the code computes $Q^{-1}(v)$;
Δmin is a constant representing the required precision (e.g., 0.00001);
$p_{min}$ is the minimum probability to check (typically initialized to 0.0);
$p_{max}$ is the maximum probability to check (typically initialized to 1.0);
$p_{mid}$ is the current estimated probability;
Δp is the change in probability (typically initialized to 1.0); and
v' is the quantile value corresponding to $p_{mid}$.
Note
When this procedure is complete, $p_{mid}$ contains an estimate of $Q^{-1}(v)$ to within Δmin.

Having computed an estimate for the CDF (i.e., $Q^{-1}(v)$), the methods described above are used to determine the expected number of samples in each bin of the approximate histogram.

Figure 13:
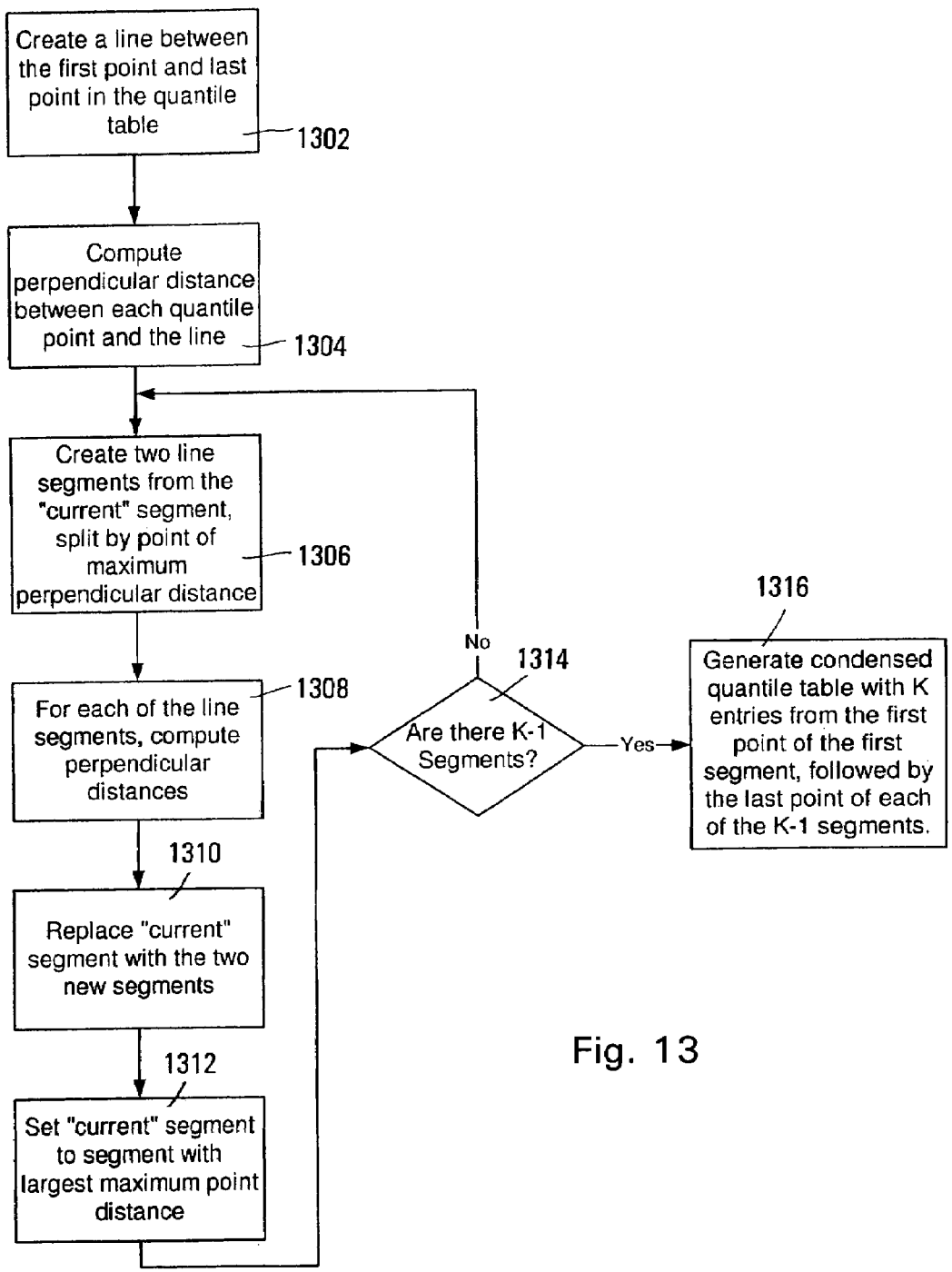
FIG. 13 is a flowchart of an adaptive fit algorithm that may be used according to an embodiment of the invention to choose the points for a condensed quantile tables.

FIG. 13 shows a flowchart for an adaptive fit algorithm 1300, which may be used in step 1204, to choose the points for a condensed quantile table. The adaptive fit algorithm chooses subsamples from the estimated quantile table such that the subsamples are closely spaced where the quantile function has high curvature, and are spaced farther apart where there is less curvature.

Generally, the adaptive fit algorithm 1300 takes an estimated quantile table (Q), which includes a set of pairs (pi, vi), where i is from 1 to N. A goal is to generate a condensed quantile table, including a set of K pairs ($ps_j$, $vs_j$), where j is from 1 to K, and K is much less than N. Preferably, the condensed quantile function will closely approximate Q, so that the condensed quantile table retains most of the information in the larger estimated quantile table.

In step 1302, a line is created between the first point in the quantile table and the last point, using the p and v values as x and y coordinates, respectively.

Next, in step 1304, the system computes the perpendicular distance between each quantile point and the line that was created in step 1302 (i.e., the distance between the line and the point along a linear path that runs perpendicular to the line). The line and the point that has the maximum perpendicular distance from the line are recorded in a segment list. Additionally, the "current" segment is set to this line.

In step 1306, the system creates two line segments from the "current" segment. The first of these line segments extends from the first point of the "current" segment to P, the point along the "current" segment having the maximum perpendicular distance from the "current" segment. The second segment extends from P to the last point of the "current" segment.

In step 1308, for each of the two line segments created in step 1306, the system computes the perpendicular distance between each point on that segment and the line between the first point of the segment and the last point of the segment. The system records the location of the point that has the maximum distance from the line segment.

In step 1310, the system removes the "current" segment from the segment list, and inserts in its place the two new segments, each of which consists of a line, and a most distant point.

Next, in step 1312, the system finds the segment in the segment list that has the largest maximum point distance, and makes this segment the "current" segment. The system then repeats steps 1306–1312 until the segment list has K−1 segments (step 1314).

Finally, the system generates a K point condensed quantile table by taking from the segment list the first point of the first segment, followed by the last points of the K−1 segments in the segment list, in order. As discussed above, this condensed quantile table can be used to generate an approximate histogram.

The approximate histograms that are generated by the above-described methods may be used for many of the same purposes for which a normal histogram may be used. In addition, because the amount of information needed to generate an approximate histogram is considerably less than what is needed to generate a regular histogram, and approximate histograms may be quickly generated from condensed quantile tables, use of approximate histograms may be used in instances where use of a regular histogram would be impractical.

Stack-Bar Histogram Charts

In accordance with an illustrative embodiment of the invention, approximate histograms may be used to create stack-bar histograms, which permit numerous histograms to be displayed on a single screen. The ability to display numerous histograms on a single screen permits a viewer to see trends in the data that would not have been readily ascertainable without such a display.

Figure 14:
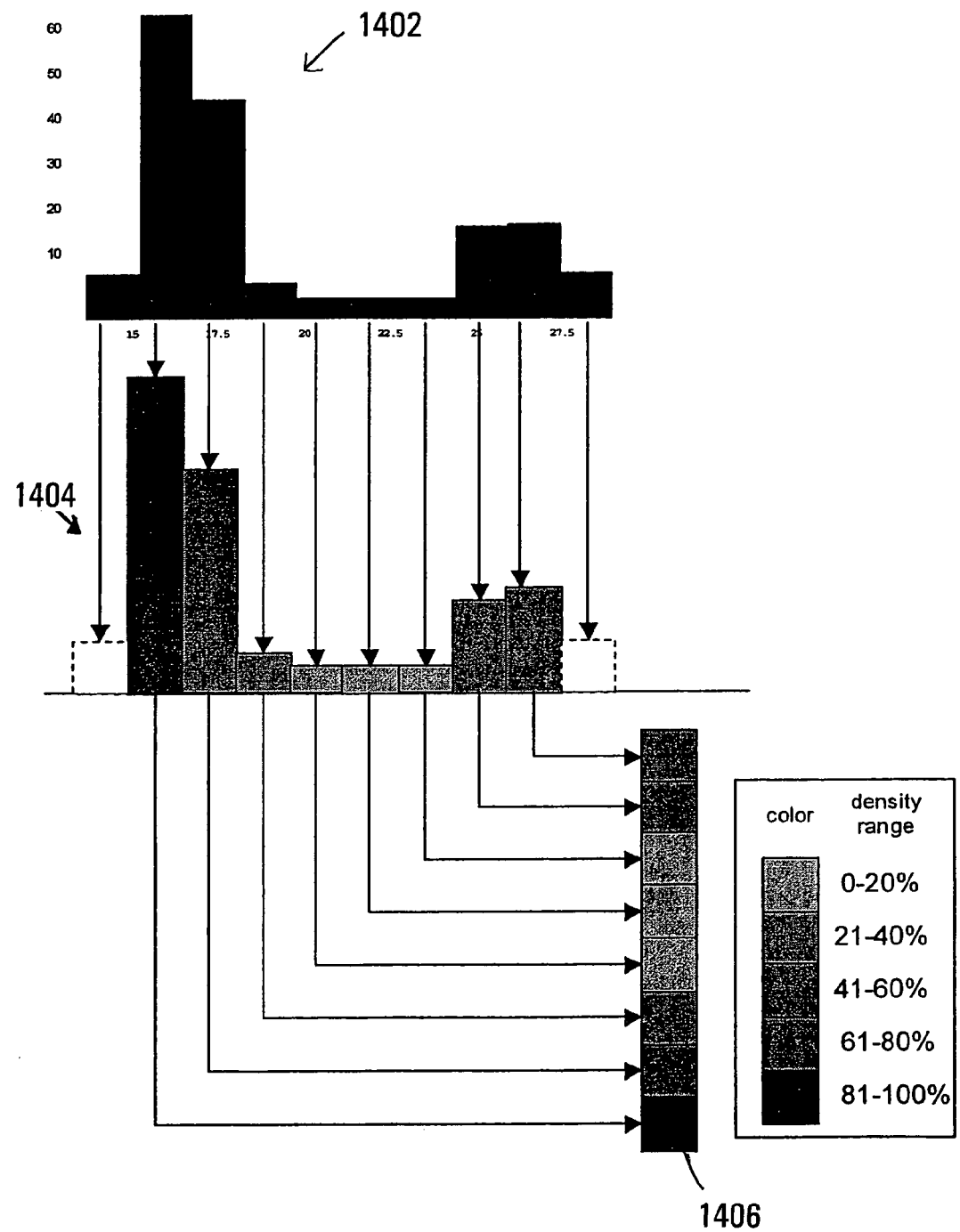
FIG. 14 illustrates the rendering of the data of an approximate histogram as a stack-bar histogram, in accordance with an embodiment of the invention.

FIG. 14 illustrates the conversion of an approximate histogram into a stack bar histogram. The first and last bins of histogram 1402 are removed to create histogram 1404. The height of each bin in histogram 1404 determines a shade, texture, color, or other visual indicium that is applied to represent that bin. In the example shown in FIG. 14, light shades or textures generally represent a bin with fewer entries, while dark shades or textures represent a bin with many entries. The shades, textures, or colors that represent the bins are then arranged as a set of vertical cells to form stack bar histogram 1406.

Stack bar histogram 1406 represents a data distribution using shades, textures, or colors, rather than using the height of bars to show the number of items in each bin. Advantageously, since such stack bar histograms are more compact than a regular representation of a histogram, numerous such stack bar histograms may be arranged in a single display.

Figure 15:
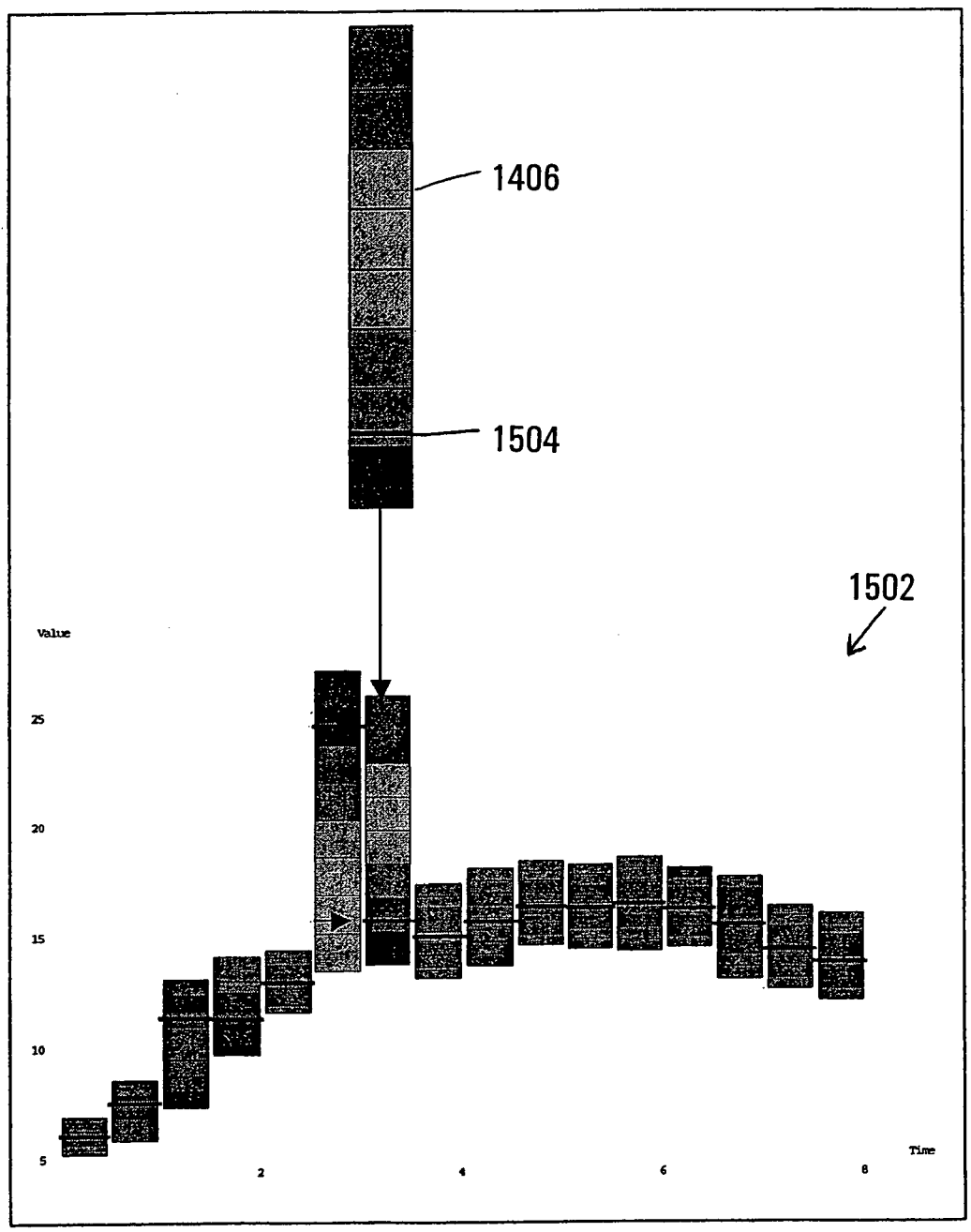
FIG. 15 shows numerous stack-bar histograms arranged in a single display, in accordance with an embodiment of the invention.

FIG. 15 shows numerous stack-bar histograms arranged in a single display. As can be seen, stack-bar histogram 1406, from FIG. 14, is the seventh stack-bar histogram of sixteen that are shown in display 1502. The relative vertical positions and heights of the stack-bar histograms shown in display 1502 reflect the upper and lower limits of the data represented by the individual histograms. Additionally, each of the stack-bar histograms in display 1502 includes a boundary, such as dark line 1504 in stack-bar histogram 1406, which indicates the median of the data that is represented by the stack-bar histogram.

Displaying numerous stack-bar histograms side-by-side, as shown in display 1502, makes it easy to track shifts in the mean, and in the shape of the distribution. For example, in display 1502, it is easy to see that the mean of the metric tended upward at first, and then leveled off. It can also be seen that the distribution varied from one where most of the values were evenly distributed about the median to others where most of the values concentrated near the lower or higher end of the range.

Figure 16:
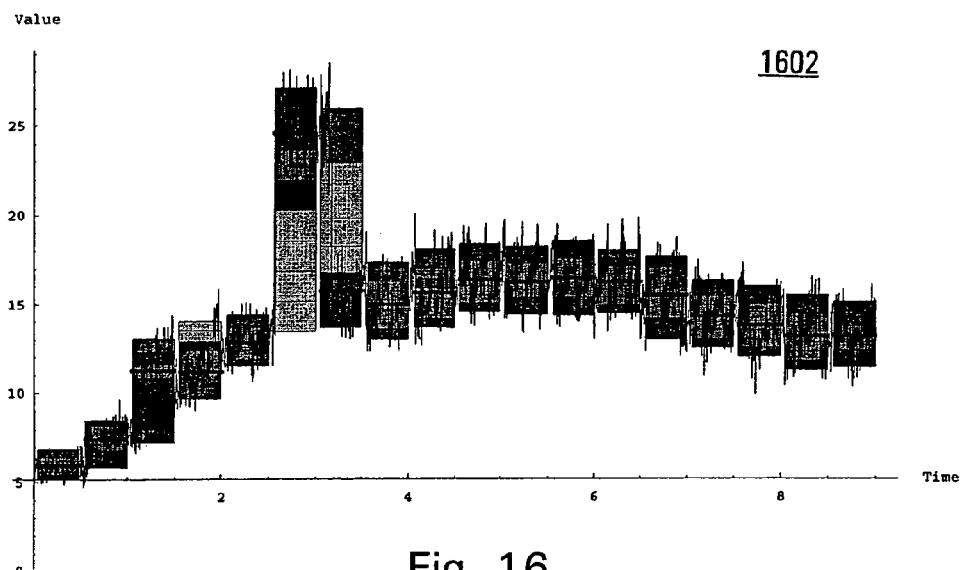
FIG. 16 shows a time-series of stack-bar histograms with the data from which the stack-bar histograms were generated overlaid, to verify the accuracy of stack-bar histograms.

FIG. 16 shows a time series of stack-bar histograms, such as is shown in FIG. 15, with the data from which the histograms were generated overlaid on the stack-bar histograms. Display 1602 shows that the stack-bar histograms are accurate representations of where the data is concentrated, and that they reasonably show the spread in each time interval, reflecting the shape and trend of the original data. The darker shaded or textured areas of the stack-bar histograms in display 1602 correctly indicate the heavy concentrations of data points, and the lighter shaded or textured areas correctly indicate the light concentrations of data points. Because the stack-bar histograms show the 5%–95% values of the data, the actual minimum and maximum limits of the data can be seen, and can be read from the vertical scale of display 1602.

Figure 17:
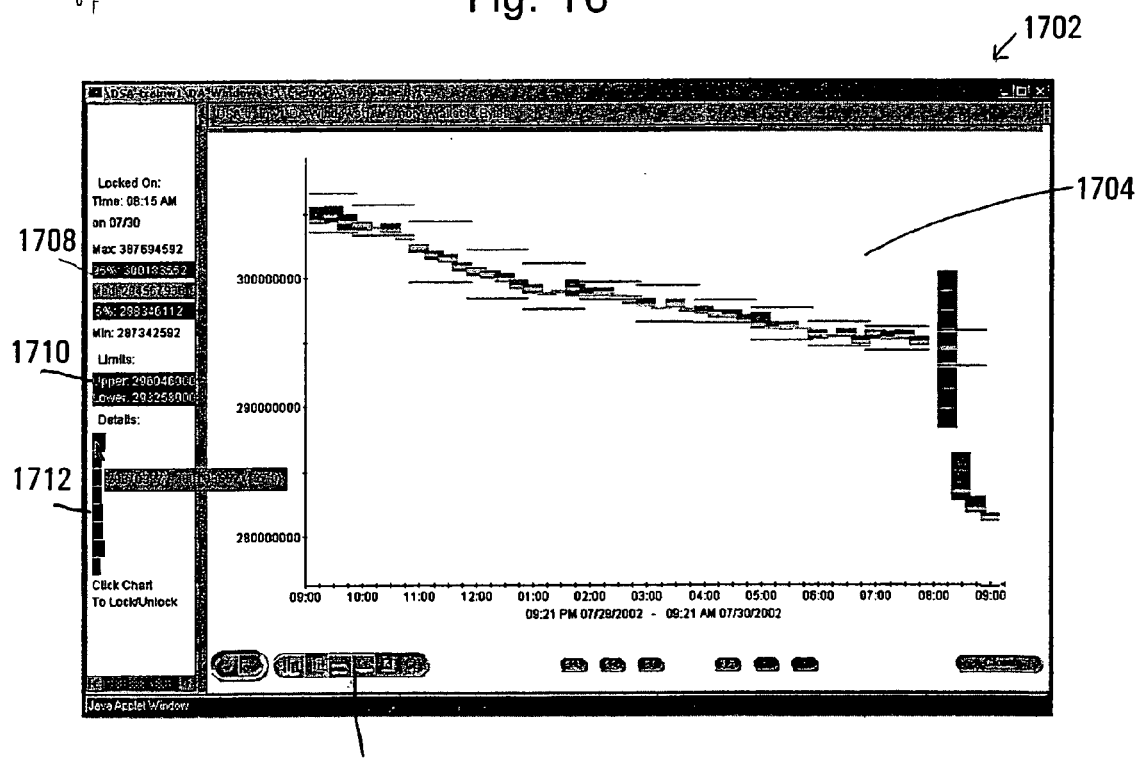
FIG. 17 shows a display of an example embodiment of a monitoring system that uses stack-bar histograms, according to an embodiment of the present invention.

FIG. 17 shows a display 1702 of an exemplary embodiment of a monitoring system that uses stack-bar histograms, in accordance with the principles of the invention. The main area 1704 of display 1702 shows 48 stack-bar histograms, representing twelve hours of data, at fifteen minute intervals. Options for main area 1704 are controlled by option select buttons 1706, which include options for showing stack-bar histograms, for showing extreme values (min and max), for showing limits, which may be dynamically computed, for showing the median, and for showing certain key metric event indicators, and root cause indicators. Other options may also be included in option select buttons 1706.

Display 1702 also includes statistics area 1708, in which the minimum, maximum, median, and $5^{th}$ and $95^{th}$ percentiles for a currently selected interval are shown. In Limits area 1710, upper and lower dynamic limits, such as those described in commonly owned, co-pending U.S. patent application Ser. No. 10/198,689, filed on Jul. 18, 2002, are shown. Histogram area 1712 displays a regular histogram for the currently selected area, and permits a user to view information including the range and count in each bin of the histogram by placing the cursor over the bars that represent the bins of the histogram.

It will be understood that display 1702 is an example of one display screen that uses stack-bar histograms, and that many variations are possible. Generally, such stack-bar histograms may be used in any system in which it is desirable to simultaneously display data distribution information over numerous related sets of data.

Merging Sets of Quantile Functions

When building displays based on stack-bar histograms, as shown in the foregoing figures, it may be useful to be able to aggregate multiple quantile functions, either to combine multiple time intervals, or to represent an aggregation of multiple instances of the same variable at the same time interval. Since direct quantile averaging methods generally do not preserve the overall range and distribution information from the individual quantile functions, it may be desirable to use a merging technique for quantile functions, as described hereinbelow.

For example, given two condensed quantile function tables (Qa, Qb) representing the quantile functions for a single metric for two adjacent time intervals, a single merged quantile function may be produced. When two quantile functions are merged, the resulting quantile function is approximately the same as that which would have been created if the two original data sets were merged and the quantile function of the resulting data set was computed. When this is done, the total range and distribution of the two data sets is preserved.

Figure 18:
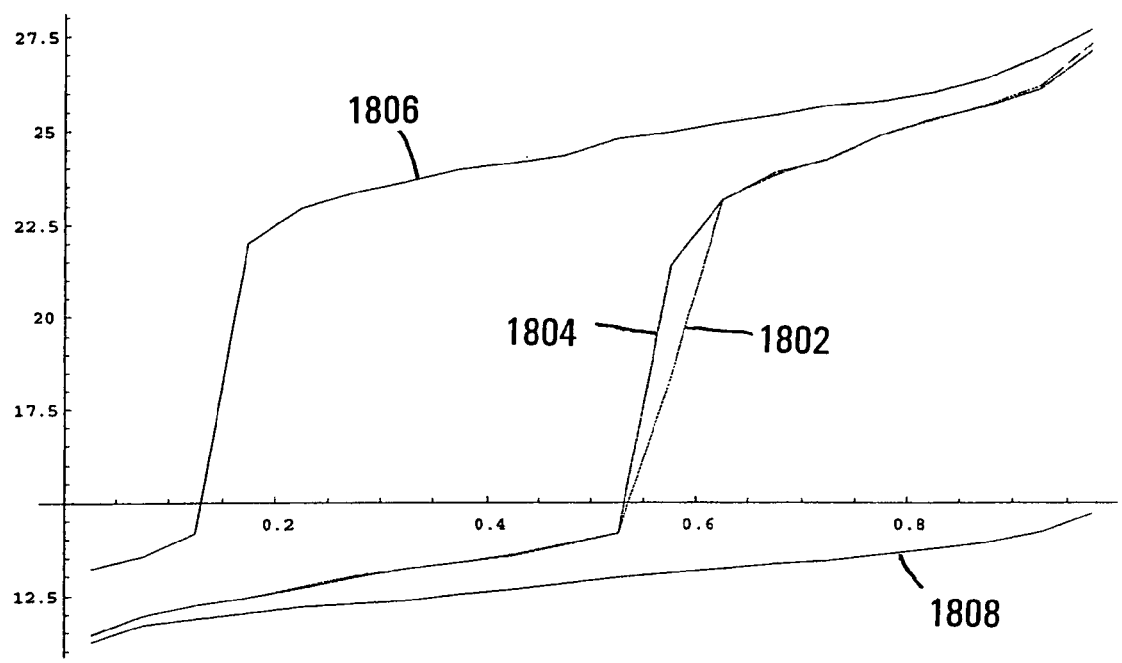
FIG. 18 is an example showing a merged sample quantile function, as well as quantile functions of two original data sets, and of the joined data from the two original data sets according to an embodiment of the invention.

FIG. 18 shows an example of merged sample quantile function 1802, sample quantile function of the joined data 1804, and sample quantile functions 1806 and 1808 of the two original data sets. This merging technique is easily extended to the merging of multiple quantile functions.

The merge is accomplished by interleaving of the quantile values of the quantile functions to be merged, and then computing the average of $Qa^{-1}$ and $Qb^{-1}$ at each interleaved value. This has the effect of determining at each value ($v_i$), what percentage of the values from the data associated with Qa would be less than $v_i$, and what percentage of those associated with Qb would be less than $v_i$. Given that an equal number of total samples are drawn from each data set, the average percentage $Qm^{-1}(v_i)$ is the percentage of the total that would be less than the quantile value $v_i$ at the given point. This may be expressed as:

$$Qm^{-1}(v_i)=(Qa^{-1}(v_i)+Qb^{-1}(v_i))/2$$

Figure 19:
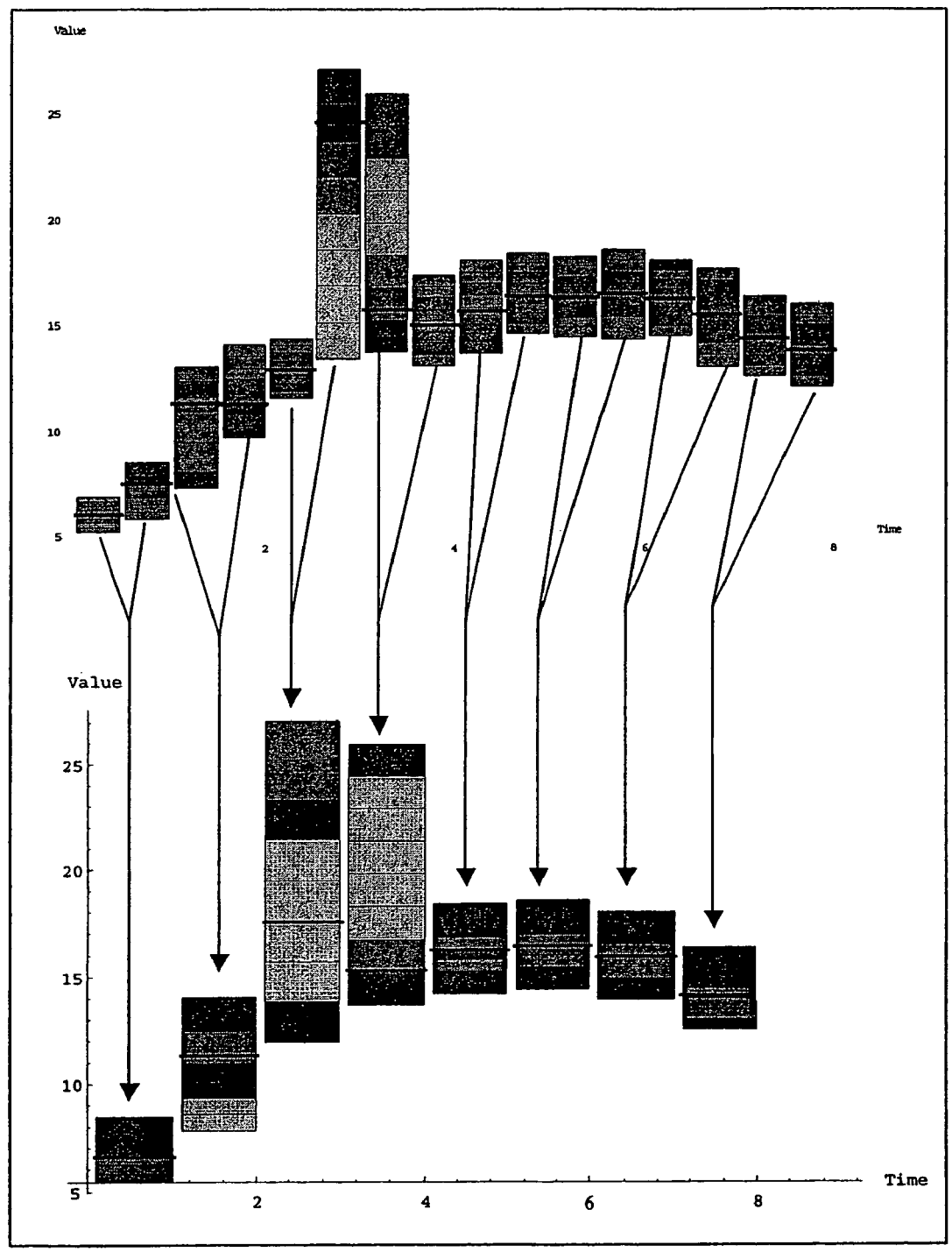
FIG. 19 shows an example in which stack bar histograms are merged to form a new stack-bar histogram according to an embodiment of the invention.
Figure 20:
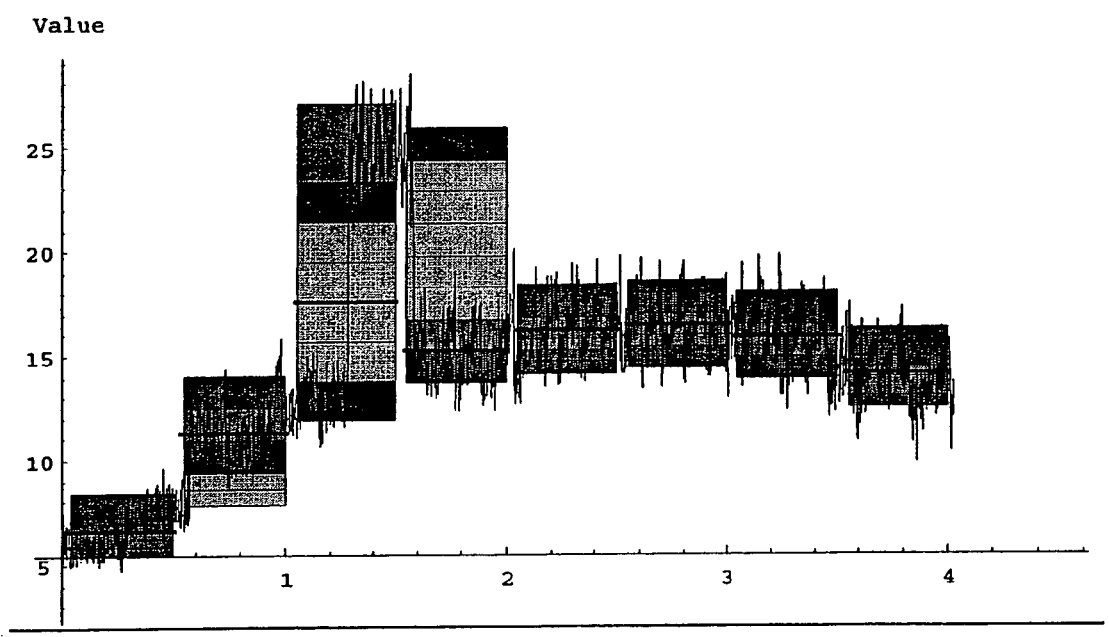
FIG. 20 shows a merged stack-bar histogram chart with data points overlaid, to verify the accuracy of the merged stack-bar histogram chart.

FIG. 19 shows an example in which stack-bar histograms 1902, which are the same as the stack-bar histograms shown in FIG. 15, are merged using the above-described method to form stack-bar histograms 1904. Stack-bar histograms 1904 are formed by merging every two quantile tables of stack-bar histograms 1902. FIG. 20 shows the new condensed stack-bar chart with a data point overlay, demonstrating the accuracy of this method of graphic generation from merged quantile function tables. The merged stack-bar histograms are based on the estimated histograms of the merged data sets. As can be seen, these merged estimated histograms preserve the distribution information of the combined data.

Figure 21:
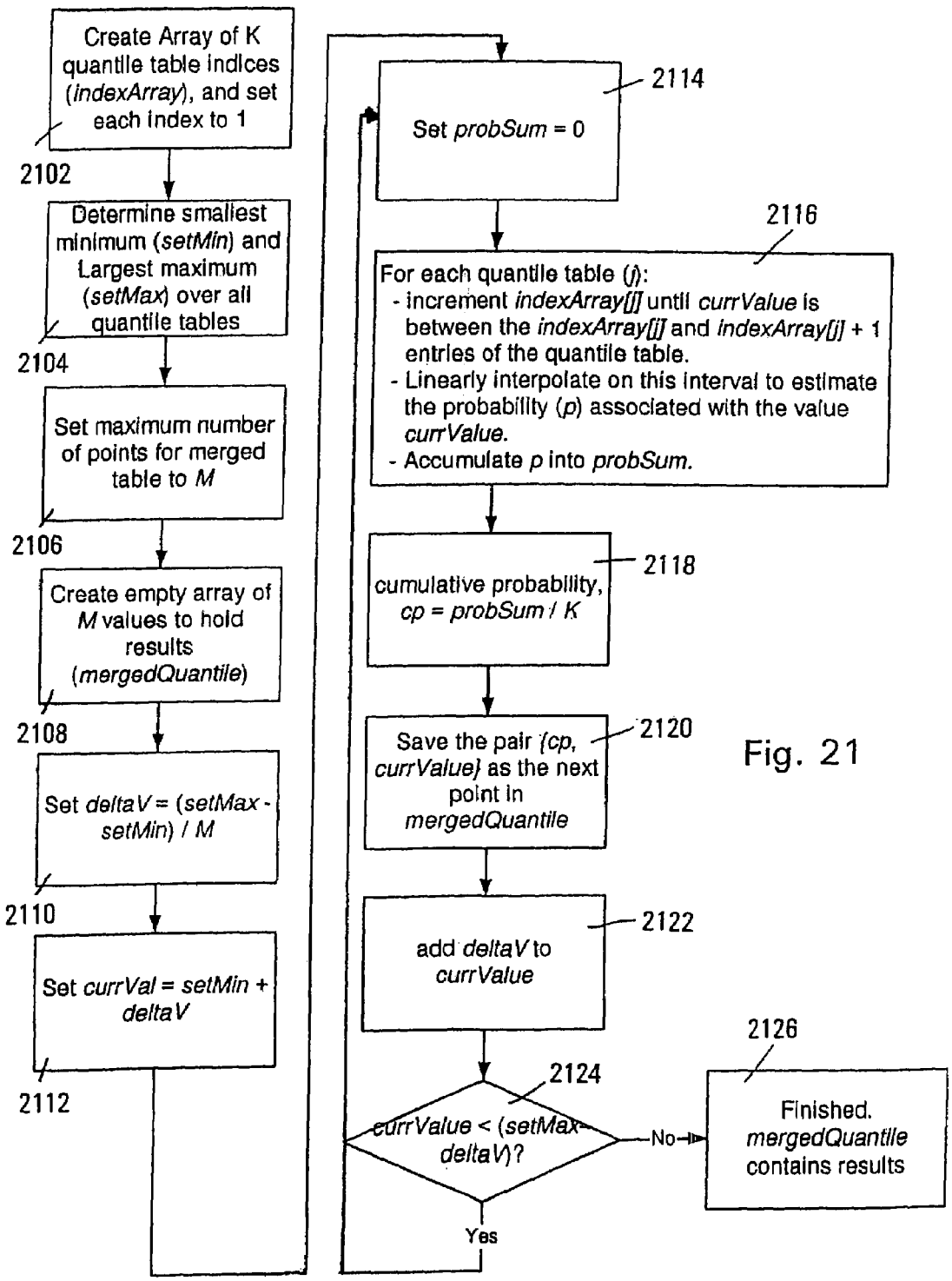
FIG. 21 is a flowchart of an algorithm for merging quantile functions according to an embodiment of the invention.

FIG. 21 shows a flowchart of a fast algorithm 2100 for merging quantile functions. When merging quantile tables, the inverse of the quantile function is evaluated for each quantile table at values spread over the total range of all the quantile tables. A performance improvement may be obtained by noting that the inverses can be evaluated on a sorted set of values, where each value is greater than the previous. Thus, for each quantile table, the current value can be found by searching ahead from the point at which the last value was found. This may be on the current interval between two table entries, or on the next interval between two table entries.

The algorithm operates on a set of K quantile tables, and produces a merged quantile table.

At step 2102, an array of K quantile table indices (indexArray) are created, and each index is set to 1.

Next, at step 2104, the smallest minimum (setMin) and the largest maximum (setMax) are found over all the quantile tables that are being merged.

In step 2106, the maximum number of points for the merged quantile table is set to a "reasonable" value, M. Typical values of M may be the sum of the number of points in each quantile table, the average number of points in each quantile table, or a value between these two. In step 2108, the system creates an empty array of M values to hold the result of merging the quantile tables (mergedQuantile).

In step 2110, the system sets a variable (deltaV) representing the change in value for each step to the difference between setMax and setMin, divided by the number of merged quantile points, M. In step 2112, the system sets the current value (currValue) to setMin plus delta V. Next, in step 2114, the system sets the value of a variable, probSum, to zero, to begin accumulation for an average.

In step 2116, for each quantile table (i) in the set of quantile tables being merged, the system increments indexArray[j] until currValue is between the indexArray[j] and indexArray[j]+1 entries in the quantile table. The system then linearly interpolates on this interval to estimate the probability (p) associated with the value currValue, given the interval endpoints. The result, p, is an estimate of the inverse quantile function $Q^{-1}$(currValue). The probability, p, is then accumulated into probSum.

In step 2118, the average cumulative probability, cp, is computed as probSum divided by K.

In step 2120, the system saves the pair {cp, currValue} as the next point in the merged quantile table, mergedQuantile.

In step 2122, deltaV is added to currValue, and steps 2114 through 2122 are repeated until currValue reaches setMax−deltaV (step 2124).

When the process is complete, in step 2126, the table mergedQuantile holds the resulting merged quantile table.

Note that because FIGS. 1, 2, 12, 13, and 21 are block diagrams, the enumerated items are shown as individual elements. In actual implementations of the invention, however, they may be inseparable components of other electronic devices such as a digital computer. Thus, actions described above may be implemented in software that may be embodied in an article of manufacture that includes a program storage medium.

What is claimed is:

1. A method for optimizing a distributed process system including providing a visual indication of behavior and trends by generating an approximate histogram of a data set, the method comprising the steps of:
    applying a quantile function on the data set to create a computational result;
    selecting a subset of the data set in response to the computational result;
    determining a condensed quantile function from the subset of the data set; and
    rendering the approximate visual histogram display in response to the condensed quantile function, including calculating an expected sample count based at least in part on an inverse of the condensed quantile function.

2. The method of claim 1 wherein the subset of the data set includes at least one of a minimum value of the data set, a median value of the data set, and a maximum value of the data set.

3. The method of claim 1 wherein the step of determining the condensed quantile function further comprises the step of interpolating between a plurality of values in the data set.

4. The method of claim 1 wherein the interpolating step comprises at least one of the linear interpolation and polynomial interpolation.

5. The method of claim 1 wherein the approximate histogram comprises a plurality of bins, the rendering step further comprising the steps of:
    reducing the plurality of bins in the approximate histogram into a plurality of adjacent cells; and
    applying an indicium to each cell in response to a percentage of the data set within each cell.

6. The method of claim 5 wherein the indicium is visually discernable.

7. The method of claim 1 for optimizing a distributed process system including providing a visual indication of behavior and trends, further comprising the steps of merging a plurality of data sets with reduced data storage requirements, comprising the steps of:
    calculating a condensed quantile function for each data set, each condensed quantile function supplying quantile values;
    interleaving the quantile values;
    calculating an inverse of each condensed quantile function at each interleaved quantile value;
    calculating an average of the inverse of the condensed quantile functions at each interleaved quantile value;

defining a merged quantile function as an inverse of the average of the inverse of the condensed quantile functions at each interleaved quantile value, and rendering a merged histogram in response to the merged quantile function.

8. The method of claim 7 wherein the plurality of data sets comprise data associated with a single variable from adjacent time intervals.

9. The method of claim 7 wherein the plurality of data sets comprise data associated with a plurality of instances of a single variable from a single time interval.

10. The method of claim 7 wherein the step of rendering the merged histogram further comprises the step of calculating an expected sample count based at least in part on an inverse of the merged quantile function.

11. The method of claim 7 wherein the step of rendering the merged histogram further comprises the steps of:

reducing a plurality of bins in the merged histogram into a plurality of adjacent cells; and applying an indicium to each cell in response to a percentage of the data set within each cell.

12. The method of claim 11 wherein the indicium is visually discernable.

13. A method of optimizing performance in a distributed transaction system, the method comprising the steps of:

collecting data associated with at least one system performance metric;

applying a quantile function on the data to create a computational result;

selecting a subset of the data in response to the computational result;

determining a condensed quantile function from the subset of the data;

rendering at least one approximate histogram in response to the condensed quantile function, including calculating an expected sample count based at least in part on an inverse of the condensed quantile function;

identifying at least one trend in the at least one approximate histogram; and adjusting, on an as needed basis, operation of the distributed transaction system to modify the at least one trend.

14. An apparatus for optimizing performance in a distributed transaction system comprising:

a data collection apparatus for collecting transaction system performance data;

logic to apply a quantile function to the transaction system performance data, creating a computational result;

logic to select a subset of the transaction system performance data in response to the computational result;

logic to determine a condensed quantile function from the subset of the transaction system performance data;

logic to render an approximate histogram in response to the condensed quantile function, including calculating an expected sample count based at least in part on an inverse of the condensed quantile function; and a display to render the approximate histogram.

15. An article of manufacture comprising a program storage medium having computer readable program code embodied therein for causing the generation of an approximate histogram of a data set, the computer readable program code in the article of manufacture including:

computer readable code for causing a computer to apply a quantile function on the data set to create a computational result;

computer readable code for causing a computer to select a subset of the data set in response to the computational result;

computer readable code for causing a computer to determine a condensed quantile function from the subset of the data set; and computer readable code for causing a computer to render the approximate histogram in response to the condensed quantile function, so as to generate the approximate histogram, including calculating an expected sample count based at least in part on an inverse of the condensed quantile function.

16. A program storage medium readable by a computer, tangibly embodying a program of instructions executable by the computer to perform method steps for generating an approximate histogram of a data set, the method steps comprising:

applying a quantile function on the data set to create a computational result;

selecting a subset of the data set in response to the computational result;

determining a condensed quantile function from the subset of the data set; and rendering the approximate histogram in response to the condensed quantile function, so as to generate the approximate histogram, including calculating an expected sample count based at least in part on an inverse of the condensed quantile function.

17. A method for detecting irregularities in time series data representing the performance of a complex system, comprising the steps of:

generating a quantile representation of at least one time series segment of the time series data, determining a condensed quantile representation of the at least one segment, merging sets of the condensed quantile representations, rendering an approximate histogram of each merged set of the condensed quantile representations, and concurrently displaying a plurality of associated histograms of merged sets of condensed quantile representations as a set of stack-bar histogram charts.

* * * * *